United States Patent [19]
Fischer et al.

[11] Patent Number: 5,309,221
[45] Date of Patent: May 3, 1994

[54] MEASUREMENT OF FIBER DIAMETERS WITH HIGH PRECISION

[75] Inventors: Frederic P. Fischer, Williamsville; Patrick S. K. Lee, Poughkeepsie; Raymond C. Logue, Somers; Thomas W. Parks, Ithaca, all of N.Y.

[73] Assignee: Corning Incorporated, Corning, N.Y.

[21] Appl. No.: 816,882

[22] Filed: Dec. 31, 1991

[51] Int. Cl.⁵ .............................. G01B 9/02
[52] U.S. Cl. .................. 356/355; 356/73.1; 356/357; 356/384
[58] Field of Search ............... 356/355, 357, 73.1, 356/239, 384, 385

[56] References Cited
U.S. PATENT DOCUMENTS

| | | | |
|---|---|---|---|
| 3,982,816 | 9/1976 | Watkins | 356/357 |
| 4,027,977 | 6/1977 | Frazee, Jr. | 356/73.1 |
| 4,046,536 | 9/1977 | Smithgall | |
| 4,067,651 | 1/1978 | Watkins | 356/357 |
| 4,136,961 | 1/1979 | Young | 356/239 |
| 4,176,961 | 12/1979 | Frazee et al. | 356/355 |
| 4,280,827 | 7/1981 | Murphy et al. | 356/73.1 |
| 4,307,296 | 12/1981 | Presby | |
| 4,363,827 | 12/1982 | Eichenbaum | |
| 4,501,492 | 2/1985 | Douklias | |
| 4,541,856 | 9/1985 | Maillard et al. | |
| 4,847,509 | 7/1989 | Millet et al. | |
| 4,924,087 | 5/1990 | Bailey et al. | |
| 5,185,636 | 2/1993 | Button et al. | 356/239 |

OTHER PUBLICATIONS

"Measurement of Optical Fiber Diameter Using the Fast Fourier Transform", Mustafa A. G. Abushagur and Nicholas George, Applied Optics, Jun. 15, 1980, vol. 19, No. 12, pp. 2031-2033.

"Outer Diameter Measurement of Low Birefringence Optical Fibers by a New Resonant Backscatter Technique", A. Ashkin, J. M. Dziedzic and R. H. Stolen, Applied Optics, Jul. 1, 1981, vol. 20, No. 13, pp. 2299-2303.

*Primary Examiner*—Samuel A. Turner
*Attorney, Agent, or Firm*—K. McNeill Taylor, Jr.

[57] ABSTRACT

Methods for measuring the diameters of transparent filaments with high precision, e.g., RMS standard deviations of less than 0.02 microns, are provided. The methods involve determining the average spatial frequency $\omega$ of the far-field interference pattern produced by illuminating the filament with a beam of laser light. The average spatial frequency is determined by performing a fast Fourier transform (FFT) on the interference data to obtain a coarse estimate for the average and then performing a set of discrete sequence Fourier transforms (DSFTs) in the region of the coarse estimate to obtain the desired high precision estimate of the average. Efficient on-line processing procedures are provided so that real time measurements can be performed on, for example, a moving optical waveguide fiber, at rates of 500 measurements/second and above.

46 Claims, 9 Drawing Sheets

AMPLITUDE OF THE FAR-FIELD SCATTERING IMAGE

MEASUREMENT OF FIBER DIAMETERS WITH HIGH PRECISION

BACKGROUND OF THE INVENTION

1. Field of the Invention

This invention relates to methods and apparatus for measuring the diameters of optical waveguide fibers and, in particular, to techniques for measuring such diameters with improved precision.

2. Description of the Prior Art

The precise measurement of the outside diameter of optical waveguide fibers is of central importance in both the manufacturing and quality control of such fibers. Among other things, diameter measurements are used to control the fiber drawing process and to select fiber suitable for commercial use.

U.S. Pat. Nos. 3,982,816 and 4,067,651 to Lawrence Watkins disclose an optical technique for measuring fiber diameter which is widely used in the industry. The basic components of the Watkins system are schematically illustrated in FIG. 1. As shown therein, optical waveguide fiber 13, whose cross-section has been greatly expanded for purposes of illustration, is transversely illuminated by light 15 of sufficient spatial coherence and monochromaticity to create a discernible interference pattern in the far field, that interference pattern being created by the superposition of light reflected from the fiber surface 17 and light refracted through the fiber body 13. In practice, a laser, e.g. a HeNe laser, is the preferred light source because of its wavelength stability. The following discussion is thus in terms of a laser light source, it being understood that other light sources having sufficient spatial coherence and monochromaticity can be used if desired.

As explained in the Watkins patents, in the far field, this reflected and refracted light interferes to form fringe pattern 19. For an optical waveguide fiber having a core and a cladding, the fringe pattern will in general be a function of the wavelength of the incident light and of the indices of refraction and the diameters of both the core and the cladding. However, as shown by Watkins, if the core/clad ratio is not too large and if the fringe pattern is examined at sufficiently large angles, e.g., above about ±50° in FIG. 1 for core/clad ratios of less than about 0.5, the pattern will depend almost exclusively on the diameter and index of refraction of the cladding.

Accordingly, if the index of refraction (n) of the cladding is known, the outside diameter (d) of the fiber can be determined by analyzing the fringe pattern. Specifically, the diameter can be approximated with good precision by counting the number of full and partial fringes (N) between two angles ($\theta_a$ and $\theta_b$) and then using the following equations to calculate d:

$$E(\theta_a) = \sin(\theta_a/2) + [n^2 + 1 - 2n\cos(\theta_a/2)]^{\frac{1}{2}} \quad (1)$$

$$E(\theta_b) = \sin(\theta_b/2) + [n^2 + 1 - 2n\cos(\theta_b/2)]^{\frac{1}{2}} \quad (2)$$

$$d = N\lambda/[E(\theta_b) - E(\theta_a)] \quad (3)$$

where λ is the wavelength of the laser light used to illuminate the fiber. Note that in equation 3, there is a direct relationship between diameter and fringe count. In practice, given an invariant clad index and an invariant wavelength, one can calibrate the system with an empirical constant, which when multiplied by the number of fringes gives, the diameter.

Using the fringe counting technique, root mean square (RMS) precisions on the order of 0.2 microns have been achieved for detectors having angular extents of approximately 80°. (The term "precision" is used herein in the sense of a 1 σ repeatability of the fiber diameter measurement, e.g., a diameter measurement is precise to the 0.2 micron level if repeated measurements of a fiber of constant diameter have a scatter whose standard deviation σ is less than or equal to 0.2 microns.) For a fiber having a diameter of around 125 microns, this corresponds to a percentage error of less than a two tenths of a percent. Although clearly quite precise, even higher levels of precision are needed to meet the demand for ever improved optical waveguide fibers.

For example, as optical fiber telecommunications are installed closer to the subscriber, the number of fiber-to-fiber connections and splices required in the field increases rapidly. These connections and splices need to be both easy to make and must have a very low loss. Generally, for single-mode fiber, good diameter control is crucial to meeting these two requirements. Specifically, one desires a one σ variation among fiber diameters of approximately 0.2 microns or less. Given this target, one would prefer that the system which measures and/or controls the fiber diameter have a precision of 0.02 microns or less. This precision is a factor of ten beyond the capability of fringe counting techniques used in the past.

Refinements of the basic Watkins technique can be found in various patents including Frazee, Jr. et al. U.S. Pat. No. 4,027,977 (determination of core/clad ratio by detecting the angle of maximum modulation of the fringe pattern); Murphy et al. U.S. Pat. No. 4,280,827 (use of delay circuits and comparators to analyze fringe patterns); and Smithgall, Sr. U.S. Pat. No. 4,046,536 (analysis of fringe counts in the presence of "dropouts" resulting from faults in the fiber). None of these references provide techniques for achieving the desired precision level of 0.02 microns and below.

The use of fast Fourier transforms (FFTs) to analyze fringe patterns is discussed in an article entitled "Measurement of Optical Fiber Diameter Using the Fast Fourier Transform" by Mustafa Abushagur and Nicholas George, Applied Optics, Jun. 15, 1980, vol. 19, no. 12, 2031-2033. Abushagur and George report a consistency of 0.6% in measurements obtained using the FFT method. Significantly, this error level is greater than that achieved using the conventional fringe counting techniques (see above).

Other optical techniques for measuring fiber properties, including fiber diameters, can be found in Bailey et al. U.S. Pat. No. 4,924,087 (detection of fiber defects using light scattered out of the plane of the basic diffraction pattern); Douklias U.S. Pat. No. 4,501,492 (detection of fiber defects and testing of fiber diameters using a spatial filter prepared using diffracted/scattered light from a defect-free fiber); Eichenbaum U.S. Pat. No. 4,363,827 (detection of "caustic" surfaces in the pattern of scattered light produced by a coated optical fiber in order to control the coating process); Maillard et al. U.S. Pat. No. 4,541,856 (use of "diffused" light to detect bubbles, blisters, and solid particles in a stream of molten glass); Millet et al. U.S. Pat. No. 4,847,509 (use of two perpendicular optical systems to measure fiber diameter in which each system forms a blurred image of the fiber on a strip of photodetectors); Presby U.S. Pat. No. 4,307,296 (measurement of core diameter by inducing fluorescence of an index-modifying dopant in the core); and Young, II U.S. Pat. No. 4,136,961 (detection of defects in glass blanks by rotating the blank through a thin beam of light).

The use of near-field resonant backscattered light to determine fiber diameters and ellipticity is discussed in an article entitled "Outer Diameter Measurement of Low Birefringence Optical Fibers by a New Resonant Backscatter Technique," by A. Ashkin, J.M. Dziedzic, and R.H. Stolen, *Applied Optics*, Jul. 1, 1981, vol. 20, no. 13, 2299-2303.

In accordance with this technique, the fiber is illuminated with light from a tunable laser. As the wavelength of the light produced by the laser is varied, resonances appear in the backscatter light. The authors predict that these resonances can be used to measure relative changes in the diameter or shape of the fiber with precisions on the order of 0.01 to 0.001 microns.

As acknowledged in their article, Ashkin et al. were only able to use their technique to make relative fiber diameter measurements, not absolute measurements. Also, although they describe real-time fiber measurements as a "possible extension" of their technique, the work reported in their article was all conducted under controlled laboratory conditions. Thus, as with the rest of the prior art, Ashkin et al. do not achieve absolute diameter measurements having precision levels of 0.02 microns and below under real operating conditions.

SUMMARY OF THE INVENTION

In view of the foregoing state of the art, it is an object of this invention to provide improved methods and apparatus for measuring the diameters of optical waveguide fibers or, more generally, the diameters of any transparent filaments. More particularly, it is an object of the invention to improve the precision with which such measurements are made. In quantitative terms, it is an object of the invention to provide methods and apparatus for making real time measurements of diameters with RMS precisions of at least about 0.02 microns and preferably on the order of 0.001 microns.

It is also an object of the invention to provide methods and apparatus of the foregoing types which are computationally efficient so that the desired high precision diameter measurements can be made rapidly on, for example, a moving optical waveguide fiber. In quantitative terms, it is an object of the invention to provide diameter measurements having the above precisions at rates of at least about 500 measurements per second and preferably as high as about 1,000 measurements per second or above.

To achieve the foregoing and other objects, the invention approaches the problem of diameter measurement from the point of view of precisely determining the spatial frequency of the Watkins interference pattern, rather than counting the fringes of that pattern. The frequency of interest is the average number of fringe cycles per spatial degree. The average is over the spatial extent of the sensor used to detect the fringe pattern, e.g., between the known angular locations $\theta_a$ and $\theta_b$ of the first and last pixels of the detector.

Once determined, the average spatial frequency is converted into a diameter measurement. In particular, a value for N in equation 3 can be obtained by multiplying the average frequency $\omega$ by $\theta_b - \theta_a$. The fiber diameter can then be obtained from equation 3 using the known wavelength of the incident light and the known index of refraction of the fiber's cladding. More directly, a conversion constant (K) can be calculated (or, in practice, determined empirically) which when multiplied by the average frequency $\omega$ gives the fiber diameter. In view of these procedures, the term "average spatial frequency of an interference pattern" is used herein to mean a frequency characteristic of the interference pattern which can be converted into a fiber diameter measurement, the precision of the diameter measurement being dependent upon the precision with which the frequency is determined.

For example, for $\theta_a = 50°$, $\theta_b = 70°$, $\lambda = 0.633$ microns, and $n = 1.457$, the calculated value of K is 40.242. Accordingly, an average spatial frequency $\omega$ of 3.106 cycles/degree corresponds to a fiber diameter of 125 microns (The foregoing numerical values are used throughout this specification to make representative calculations and will be referred to herein by such terms as "representative fiber", "representative parameters", "representative calculations", and the like. It is to be understood, of course, that these values and calculations are only for the purpose of illustration and are not to be considered limiting of the invention in any sense.)

As demonstrated below, in accordance with the invention, the average spatial frequency of an interference pattern can be determined with extremely high precision even in the presence of noise, i.e., with a precision of at least $25 \times 10^{-6}$ cycles per degree for a signal to noise ratio greater than about 80:1. For the above conversion constant, this level of precision in determining the spatial frequency corresponds to a precision of 0.001 microns in the diameter determination, which is well within the desired 0.02 micron level needed for the production of state of the art optical waveguide fibers.

For comparison, use of the output of the sensor to determine a fringe count, instead of an average spatial frequency, cannot achieve nearly as high a level of precision. The fringe count error arises primarily because of errors in detecting fringes at the ends of the angular range of the sensor caused by, among other things, noise in the signal. In particular, the count at each end can be off by as much as a quarter of a fringe. Since the total number of fringes counted is less than about 200, this error corresponds to a precision of only about 0.25%, which for a fiber having a diameter of about 125 microns, corresponds to a precision of only about 0.3 microns.

Thus, in overview, the technique of the present invention does employ the basic Watkins' model, however it does so in a different way from what has been done previously in the art. Whereas the conventional technique counted fringes and thus was subject to the problem of noise and partial fringes at the ends of the sensor range, the technique of the invention uses all of the information in the fringe pattern to determine an average spatial frequency $\omega$ for the entire pattern. This average does depend to some extent upon the measurements at the ends of the sensor range, but to a much smaller degree than fringe counting. It is this difference in combination with other signal processing aspects of the invention discussed below which permits the invention to achieve the desired improvement in precision of the diameter measurement.

The success of the invention thus depends upon being able to determine the average spatial frequency $\omega$ of the far field interference pattern with high precision. In accordance with the invention, the average spatial frequency is estimated by determining the frequency component of the fringe pattern which has the maximum spectral power. In terms of mathematical theory, it can be shown that this estimate comprises a maximum likelihood estimate for the frequency of the interference pattern provided that the frequency modulation of the original signal has been removed (see below).

Depending upon the context, the frequency component of the fringe pattern having the maximum spectral power will be referred to herein as the "O.D. line" (i.e., the outer diameter line) and/or the "brightest line" of the fringe pattern's frequency spectrum. The component being sought is, of course, is not the DC component which, in general, will have the largest power, but rather the component corresponding to the sinusoidal-like variation of the fringe pattern as a function of $\theta$. Similarly, the component being sought is not that due to defects in the fiber as discussed in U.S. patent application Ser. No. 816,491, entitled "Method for Detecting Defects in Fibers", which is being filed concurrently herewith and which is commonly assigned with this application. The relevant portions of this application are incorporated herein by reference.

The success of the invention thus becomes dependent upon being able to determine the location (frequency) of the O.D. line with high precision.

As discussed above, the Abushagur and George reference used a fast Fourier transform (FFT) to determine the frequency components of the far field interference pattern and then used the location of the peaks of that spectrum to calculate fiber diameter. Abushagur and George, however, only achieved a consistency of 0.6%, which is poorer than the results achieved with conventional fringe counting. Thus, it is not merely the use of a frequency spectrum which is important, but rather, it is the ability to determine precisely the location of the maximum peak of such a spectrum which is critical.

Put simply, a fast Fourier transform as used by Abushagur and George cannot by itself determine the location of the maximum peak with sufficient precision to achieve a RMS error in the measurement of fiber diameter of less than 0.02 microns. (Note that, as discussed fully below, in certain embodiments of the invention, a fast Fourier transform is used to make an initial analysis of the interference fringe pattern. However, the fast Fourier transform is not used to make the ultimate determination of the location of the O.D. line from which the fiber's diameter is derived.)

The fast Fourier transform operates by taking a set of M real data point values, e.g., the amplitudes of the far field interference pattern at M equally-spaced values of $\theta$, and converting those values into a set of M complex quantities (coefficients) at M equally-spaced spatial frequencies. The magnitudes of the M coefficients correspond to the spectral power at the different frequencies. The spacing between the frequencies ($\Delta f$) is equal to $1/M\Delta\theta$, where $\Delta\theta$ is the spacing between the original data points. The first M/2 coefficients and the second M/2 coefficients are related to one another in that they comprise mirror images of one another about the Nyquist frequency. (The Nyquist frequency, which is also known as the folding frequency, is equal to one half the sampling frequency, where the sampling frequency equals the number of samples divided by the angular extent of the detector, e.g., for 256 sample points distributed over a 20° detector, the sampling frequency is 12.8 cycles per degree and the Nyquist frequency is 6.4 cycles per degree.)

The problem with the fast Fourier transform approach as used by Abushagur and George can be seen by calculating the change in fiber diameter corresponding to a change from one line of the FFT spectrum to an adjacent line. Assuming a 20° detector divided into M equal segments (pixels), the spacing between adjacent lines of the FFT spectrum ($\Delta f$) is equal to 0.05 cycles/degree. ($\Delta f = 1/M\Delta\theta = 1/(M(20°/M)) = 0.05$ cycles/degree.) Using the 40.242 conversion constant set forth above, a change from one line to the next corresponds to a diameter change of about 2 microns.

As this calculation demonstrates, the FFT spectrum is too coarse to obtain the desired precision of at least 0.02 microns. Some improvement can be achieved by increasing the angular extent of the detector, but even for an 80° detector, $\Delta f$ is only 0.0125 cycles/degree. Moreover, the conversion constant K is somewhat larger for the larger detector, i.e., if the 80° detector extends between 6° and 86°, the calculated value of K is 43.4996 for $\lambda=0.633$ microns and $n=1.457$. Accordingly, even if the interference pattern is sampled over a larger angular range, the FFT as used by Abushagur and George still can only achieve a precision on the order of 0.54 microns, which is more than twenty-five times too big.

It is this problem which makes the Abushagur and George approach unsuitable for achieving the levels of precision which the present invention is designed to provide.

To overcome the imprecision of the prior art techniques, the present invention uses discrete sequence Fourier transforms (DSFTs) calculated on a fine grid, instead of a coarse fast Fourier transform (FFT), to determine the location of the O.D. line with very high precision.

Indeed, by utilizing this approach in combination with other error reducing aspects of the invention, the standard deviations for diameter measurements made with the invention are essentially equal to the theoretical lower limit (the Cramer-Rao bound) for such deviations. The achievement of this lower limit indicates that although there may exist other techniques for determining fiber diameters from far field interference patterns which exhibit high precision, none of those other techniques, if unbiased, will be more precise than the technique of the present invention.

In general terms, a discrete sequence Fourier transform operates by taking a set of M data point values $x(k\Delta\theta)$, $k=0,1,2,...,M-1$, and converting those values into a single complex quantity $C(f)$ at a selected spatial frequency f in accordance with the following equation:

$$C(f) = \sum_{k=0}^{M-1} x(k\Delta\theta)\, e^{-ifk\Delta\theta} \qquad (4)$$

See A. V. Oppenheim and R. W. Schafer, *Discrete-Time Signal Processing*, Prentice-Hall, Englewood Cliffs, N.J., 1989, page 45.

DSFTs differ from FFTs in that each time a DSFT is performed, only one Fourier coefficient is generated, whereas for FFTs, a whole set of Fourier coefficients are generated. As a result, DSFTs are much less computationally efficient than FFTs as can be readily seen from the fact that M/2 DSFTs would be needed to generate the M/2 non-redundant coefficients obtained from a single FFT. It is for this reason that for most applications, FFTs are preferred over DSFTs. Indeed, Abushagur and George undoubtedly selected the FFT for their work based on this conventional wisdom.

Although they are computationally inefficient, DSFTs have an advantage over FFTs in that the frequency at which the coefficient is determined can be selected by the user. In contrast, for an FFT, the frequencies are fixed at the values $k/M\Delta\theta$, $k=0,1,2,...,M-1$. It is this advantage of the DSFT which is used in the present invention to achieve the desired high level of precision in determining fiber diameters.

The DSFT approach of the invention can be applied in various ways to determine the location of the O.D. line.

One approach is to calculate coefficients on a sufficiently fine grid so that simply converting the frequency corresponding to the largest coefficient to a fiber diameter will be precise to within 0.02 microns. The grid can, for example, extend up to the Nyquist frequency. Using the 40.242 conversion constant, the spacing which will achieve this goal is approximately 0.0005 cycles/degree. Accordingly, to cover a range of 6.4 cycles per degree requires the performance of 12,800 DSFTs. Calculating this many DSFTs is computationally intensive. However, in view of the ever increasing speed of digital computers, the approach can be used if desired.

A preferred approach is to reduce the number of DSFTs which need to be performed by limiting the range over which the fine grid is used to frequencies where the O.D. line is expected to be found. A preferred method for identifying these frequencies is to perform a FFT on the original data and then use the frequency of the largest coefficient determined by that transform as the center point of the fine grid for which the DSFTs are calculated. In practice, it has been found that this approach allows for the use of a fine grid having a very small size, e.g., a total of 11 DSFTs.

In addition to providing information on where to locate the fine grid, the initial FFT can also be used to check the power level of the light source by, for example, summing the amplitudes of the FFT lines and/or examining the amplitude of the DC line and/or the O.D. line. Also, as discussed in the above-referenced, copending application entitled "Method for Detecting Defects in Fibers", the initial FFT can be used to determine if defects, such as holes, are present in the fiber.

In addition to using DSFTs calculated on a fine grid to improve the precision of the diameter measurement, a variety of other precision improving techniques are employed in accordance with certain preferred embodiments of the invention. In particular, low pass filtering and downsampling of the original fringe pattern data is performed to increase the signal to noise ratio. (As used herein, the signal to noise ratio is the RMS signal divided by the RMS noise.)

Also, the variation (modulation) in the frequency of the fringe pattern across the angular extent of the detector which the Watkins model predicts, as well as that produced by the lens system used to project the interference pattern onto the detector, is removed from the data so that the DSFTs are performed on a pure sinusoidal signal.

Further, to minimize biasing of the location of the O.D. peak due to the finite extent (truncation) of the fringe pattern used in the analysis, the amplitudes of the leading and trailing data points are reduced by "windowing".

Finally, a parabolic fit is performed in the region of the brightest line of the fine grid DSFTs to provide an even better estimate of the location of the O.D. line.

Each of these precision-improving features of the invention is discussed in detail below in connection with the description of the preferred embodiments of the invention.

In addition to using a DSFT grid having a small number of lines, various other procedures which improve the computational efficiency of the process are employed in the preferred embodiments of the invention. In particular, the frequency demodulation, window correction, and fine grid DSFT steps are combined and performed off-line so that the fine grid spectrum can be obtained by simply multiplying the data values (preferably after low pass filtering) by a precalculated matrix.

Even a further reduction in on-line processing is achieved by replacing the data values with set of inverse DSFTs applied to selected FFT coefficients determined in the initial analysis of the data. This inverse DSFT step is performed off-line and combined with the other off-line steps, i.e., frequency demodulation, window correction, and the fine grid DSFTs, to produce a very small precalculated matrix which when multiplied by the selected FFT coefficients produces the desired fine grid DSF line spectrum.

Indeed, in practice, it has been found that only 15 complex FFT coefficients are needed so that to determine a fine grid DSFT spectrum containing, for example, 11 lines, all that needs to be done on-line is to multiply a complex matrix having 165 elements (i.e., a $11 \times 15$ matrix) times a complex vector comprising the 15 FFT coefficients. It is this reduction in the on-line computational effort which allows the measurement process of the invention to be practiced in real time, using generally available computer components, on, for example, a moving optical waveguide fiber at very high execution rates, e.g., 500 hertz and above, while still maintaining a precision of at least 0.02 microns.

As with the precision-improving features of the invention, each of the foregoing speed-improving features is discussed in detail below in connection with the description of the preferred embodiments of the invention.

In practice, the technique of the invention has been found to a very robust system for making real world measurements of fiber diameters. First, as discussed above, the technique is very precise in the presence of noise.

Second, the technique is extremely linear for fibers having a wide range of diameters. That is, the largest deviation between diameter values determined using the technique on simulated data and the known diameter values of those inputs over a range of fiber diameters from 40 to 250 microns is less than 0.01 microns.

Third, the technique is insensitive to analog to digital quantization and thus operates successfully over a wide range of illuminations, i.e., the technique has a large dynamic range. Indeed, even if the signal is quantified with only a 2 bit A/D converter, i.e., 4 gray scale values, the induced error is again less than 0.01 microns.

Fourth, the technique is insensitive to shifts of the interference pattern across the face of the detector. In particular, shifts of the order of one complete cycle of the interference pattern result in induced errors of less than 0.002 microns.

Fifth, the technique is unaffected by amplitude modulations of the interference pattern which may result, for example, from blemishes in the optical system used to project the interference pattern onto the detector. For example, removing 10% of the fringe pattern across any portion of the pattern results in an induced error of less than 0.003 microns.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
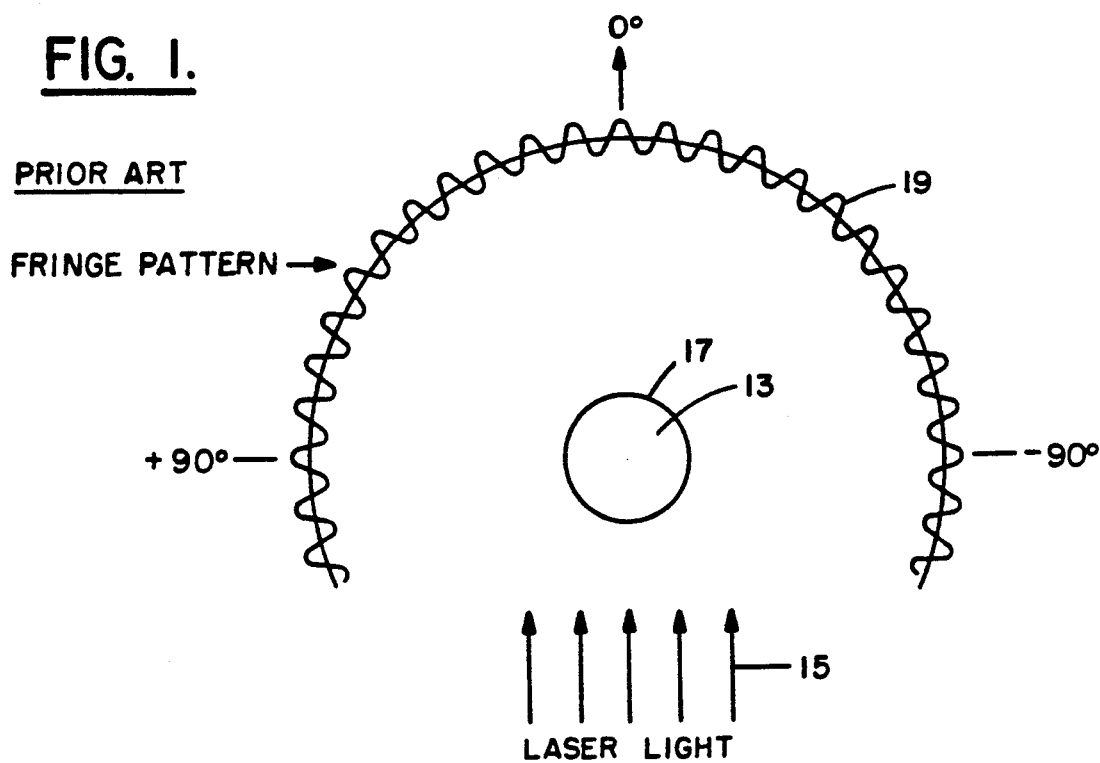
FIG. 1 is a schematic diagram illustrating the basic elements of a Watkins-type system for measuring fiber diameters using far-field interference patterns.
Figure 2:
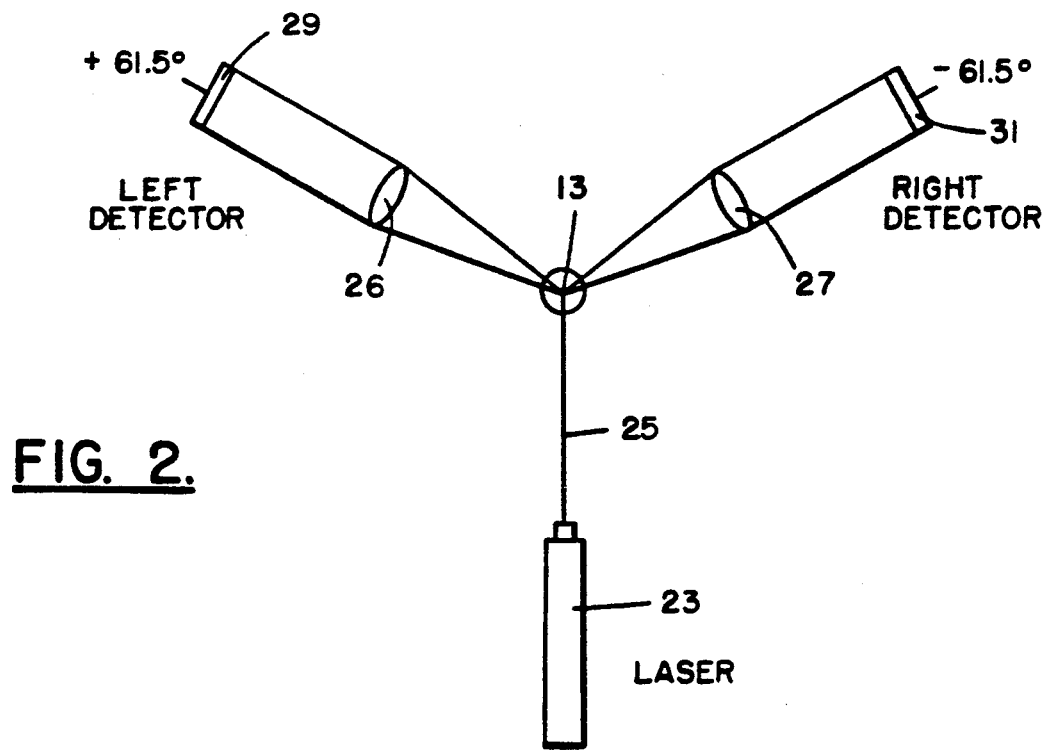
FIG. 2 is a schematic diagram illustrating the components of a fiber diameter measurement system with which the present invention can be used.

With reference now to the figures, FIG. 2 shows a system for measuring fiber diameter constructed in accordance with U.S. patent application Ser. No. 816,491, entitled "Method for Measuring Diameters of Non-Circular Fibers" which is being filed concurrently herewith and which is commonly assigned with this application. As explained in that application, the relevant portions of which are incorporated herein by reference, by using two detectors 29,31 spaced apart by approximately 120° and by averaging the diameter measurements obtained for the two detectors, a diameter measurement is obtained which is substantially insensitive to fiber ellipticity.

Because of this feature, the system of FIG. 2 represents a preferred application of the present invention. It is to be understood, of course, that the present invention can also be used with fiber diameter measurement systems which are not ellipticity insensitive, e.g., with one detector.

As illustrated in FIG. 2, laser 23 produces a beam 25 of collimated, coherent, monochromatic light. Light from beam 25 is reflected and refracted by fiber 13 so as to produce a far-field interference pattern according to equations 1-3. The typical appearance of the pattern for a 125 micron fiber and the representative parameters discussed above is shown in FIG. 3 for the angular range between 50 and 70 degrees.

Optical systems 26,27 project the far-field interference pattern onto left and right detectors 29,31. The detectors can comprise linear arrays of photodetectors whose output, after analog to digital conversion, consists of a digital representation of the fringe pattern. By way of example, the output of each detector can comprise 2048 digital values representing the level of illumination at each pixel of the photodetector array.

During manufacture, the fiber may translate a few millimeters from its nominal position in the plane which contains the laser and associated detector(s) (hereinafter called the x-y plane). If not corrected for, this could cause a change in the spatial frequency of the fringe patter which is projected onto the detector(s), and hence spuriously affect the diameter measurement. The optical systems should be designed so as to minimize any measurement error due to x-y translation. This is accomplished by placing the detector in the back focal surface of its associated optical system. This positioning keeps the far-field pattern substantially independent of fiber translation, since, by definition, the focal surface is the place a which translationally separated rays of equal angle converge to a common point.

Since detectors are generally flat, the optical system should preferably have a planar tangential focal surface. More preferably, the optical system should minimize the transverse magnitude of tangential aberrations in the tangential focal plane. In practice, scan lens-type systems have these properties, and have been found to perform well in this application, so long as the fiber's nominal position is at the entrance pupil of the lens. Also, since scan lenses are readily available, one can obtain good performance at reasonable cost. It should be noted that although the optical system can meet a f-$\theta$ distortion criteria, the meeting of such a criteria is not necessary since as discussed in detail below, distortions caused by the lens can be anticipated and removed in the frequency demodulation step. It should also be noted that telecentricity, schematically indicated in FIG. 2, is not required. Finally, note that sagittal aberrations in the tangential focal plane are generally inconsequential.

In addition to translating during manufacture, the fiber may also tilt by up to 1° from the perpendicular to the x-y plane, causing the scattered pattern to be deflected out of the x-y plane. If the longitudinal extents of the illumination of the fiber and/or the detector are small enough, then the far-field pattern may move up or down off the detector. This problem, if present, can be corrected by placing a cylinder lens in the optics system, oriented so that the line defining its center of curvature is parallel to the x-y plane and perpendicular to the axis of the scan lens, and positioned such that it redeflects a pattern scattered out of the x-y plane back to the detector. As an example of proper positioning, if the scan lens is telecentric, then the cylinder should be positioned so that its back focal line is at the detector surface.

It should be noted that optics ar not actually required One could simply place the detector in the x-y plane at a sufficient distance from the fiber such that the desired angular range is subtended. This arrangement has the advantage of extreme simplicity, with commensurately low cost and high reliability. Its chief disadvantage is that the average spatial frequency of the pattern on the detector is roughly proportional to the distance between the fiber and the detector. Hence, movement of the fiber from its nominal x-y location would cause measurement error. One could prevent this error by keeping the fiber sufficiently close to the nominal location, or correct for the error given knowledge of the actual fiber position. However, to keep the error below 1:5000 (0.02 microns for a 100 micron fiber) one would have to constrain, or determine, the fiber position to 1:5000 of the fiber to detector distance. In practice, in the manufacturing process, such constraint of the fiber position is impractical, and such determination of the position, while feasible, is difficult, and thus the use of an optical system is preferred.

As shown in FIG. 2, the center of detector 29 lies at $+61.5°$ and the center of detector 31 lies at $-61.5°$. The derivation of these values is discussed in detail in the above referenced copending application. A suitable angular extent for each detector is 20°, i.e., from $+51.5°$ to $+71.5°$ for detector 29 and from $-51.5°$ to $-71.5°$ for detector 31. Detectors having other angular extents can, of course, be used if desired. For example, in practice, a detector having an angular extent of 16° has been found to work successfully.

The output of each detector is analyzed separately using the procedures of the present invention to generate a signal representative of the diameter of the fiber. In accordance with the above referenced copending application, the two signals are averaged to produce a final signal which is representative of the fiber diameter and which is substantially insensitive to fiber ellipticity.

It should be noted that neither the signals generated by the present invention nor the average of those signals need actually be a diameter value in, for example, microns. Rather, the signals can be, for example, the frequency of the O.D. line or some related quantity derived from that frequency.

Figure 3:
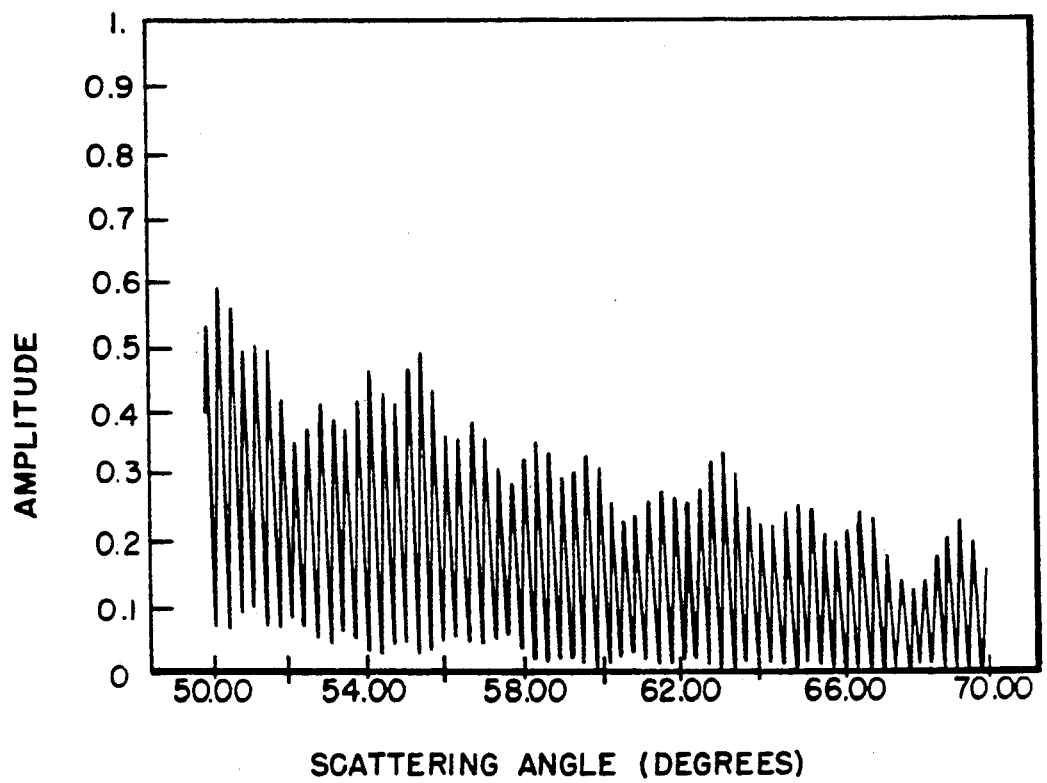
FIG. 3 shows a typical far-field interference pattern for a 125 micron fiber for the angular range between 50 and 70 degrees.

As discussed above, in overview, the process of the invention involves determining the spatial frequency $\omega$ of the O.D. line for a far-field interference pattern of the type shown in FIG. 3.

Figure 4:
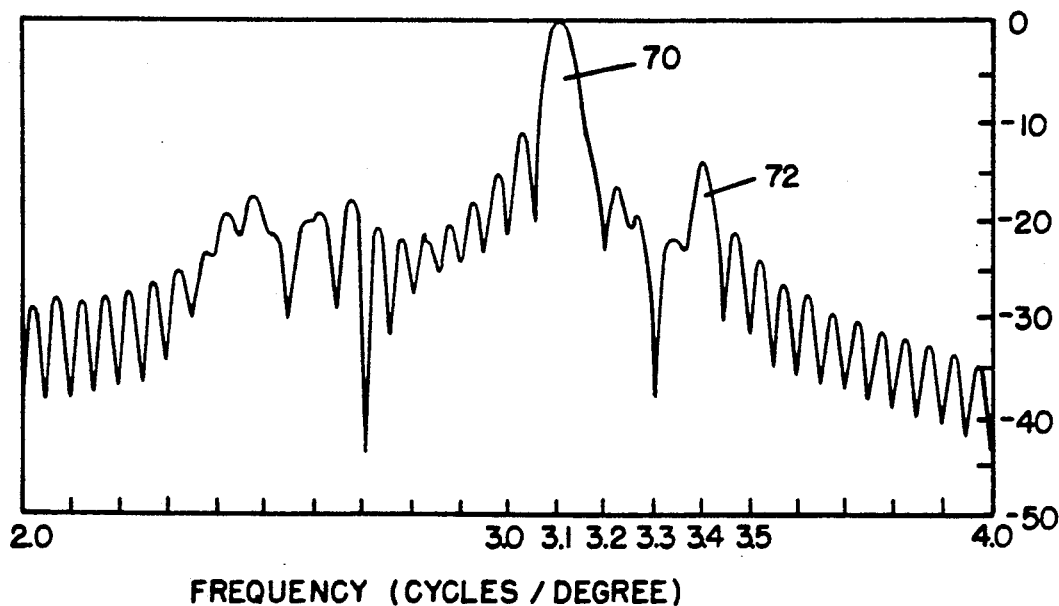
FIG. 4 shows a typical frequency spectrum for the far-field interference pattern of a 125 micron fiber over the spatial frequency range from 2.0 cycles/degree to 4.0 cycles/degree.

FIG. 4 shows the spectrum of such a pattern for spatial frequencies between 2.0 and 4.0 cycles/degree. As with the interference pattern of FIG. 3, the spectrum of FIG. 4 is for the representative parameters discussed above and a 125 micron fiber. The spectrum was determined by applying DSFTs at a spacing of 0.01 cycles/degree to a calculated interference pattern. As can be seen from this figure, the spectrum comprises a series of peaks (lines) at different spatial frequencies having various amplitudes.

Figure 5:
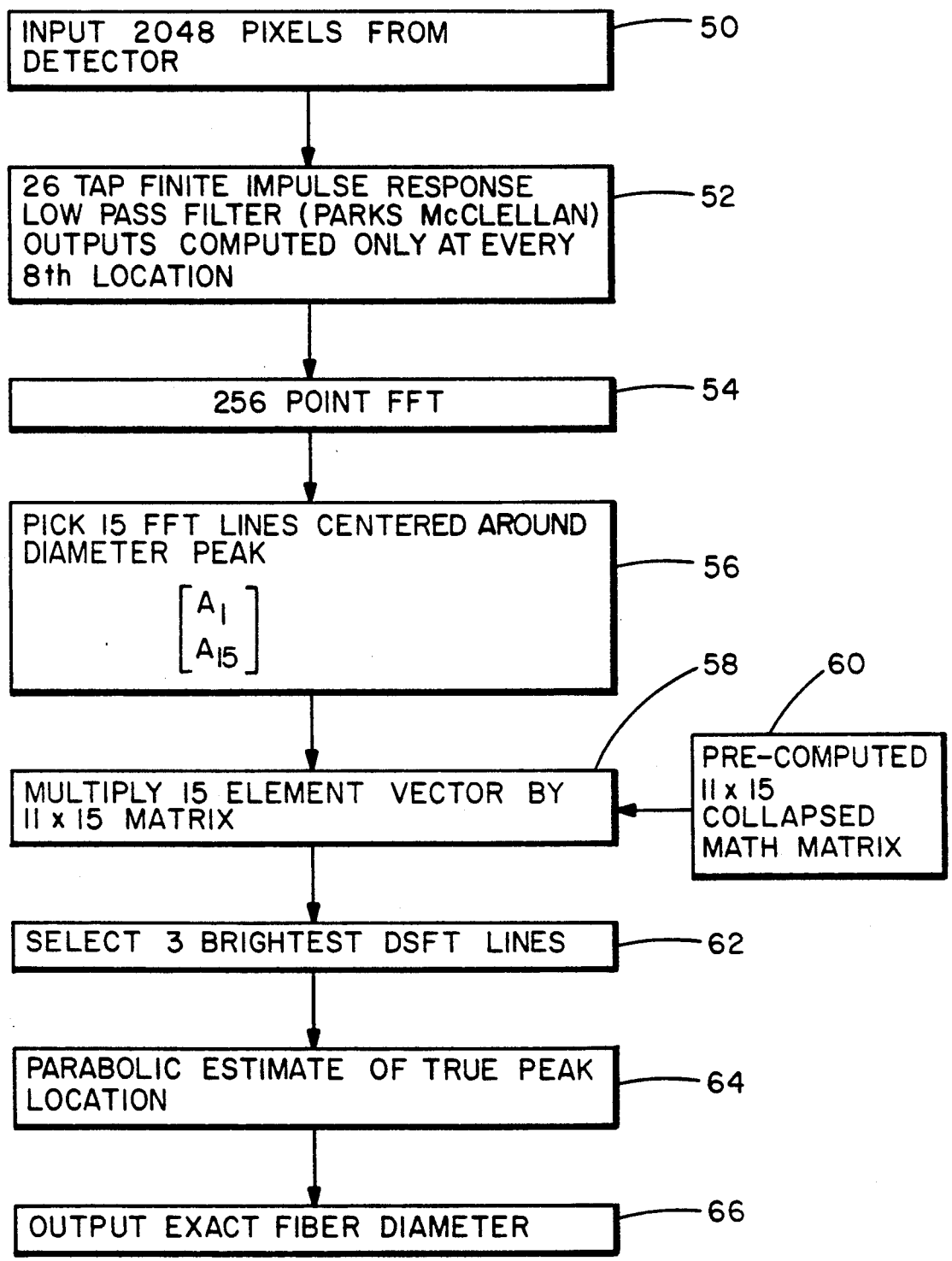
FIG. 5 is a block diagram showing the on-line steps of a preferred embodiment of the present invention.
Figure 6:
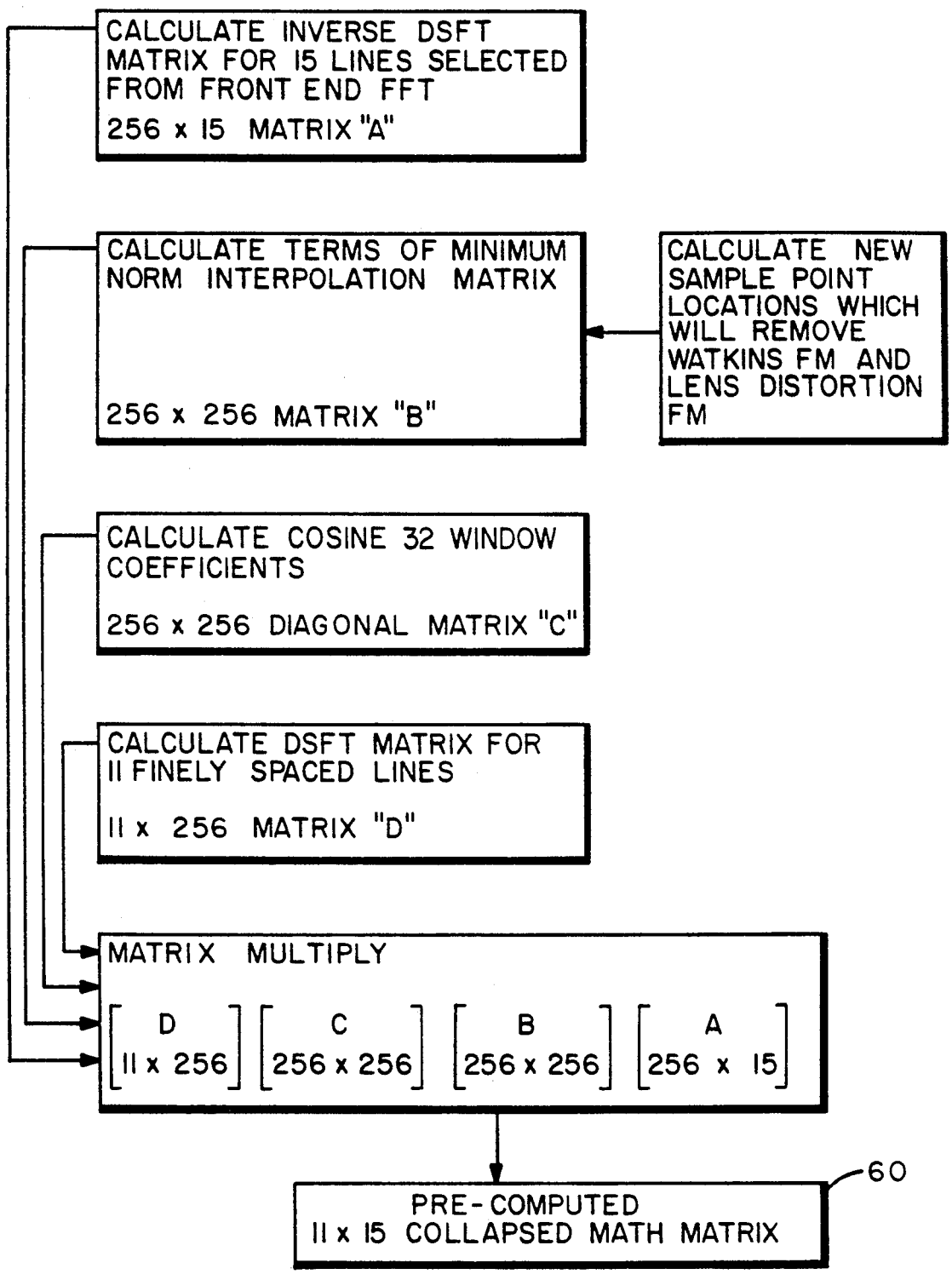
FIG. 6 is a block diagram showing the off-line steps of a preferred embodiment of the present invention.

The O.D. line for this pattern is identified in FIG. 4 by the reference numeral 70 and the gallery mode line (discussed below) by the numeral 72. The object of the invention is to find the frequency of the O.D. line with a precision of at least $5 \times 10^{-4}$ cycles/degree. The various process steps which are used to achieve this result ar shown in FIGS. 5 and 6, where FIG. 5 shows the steps which are performed on-line and FIG. 6 shows those which are performed off-line and then stored for later use by the on-line processor. The operation of these various steps is as follows:

I. Prefiltering and Downsampling

The first on-line step in processing the data representing the interference pattern is prefiltering and downsampling step 52. The purpose of prefiltering is to 1) improve the signal to noise ratio of the digital data and 2) avoid the possibility of aliasing in the subsequent downsampling procedure, i.e., a higher frequency spuriously folding down into the frequency range of interest. The purpose of downsampling is to reduce the number of data points fed to the remaining on-line processing steps so as to minimize on-line processing time.

By taking more samples than are needed and then low pass filtering and eliminating unneeded samples, the signal to noise ratio ("s/n ratio") of the data is significantly improved. In particular, the s/n ratio is increased by the square root of decimation rate (e.g., by about 2.8 for a reduction from 2048 samples to 256 samples).

The cut-off frequency of the low pass filter is selected so that the O.D. frequencies for the fiber diameters of interest remain in the data after filtering. As can be seen from equation 3, the O.D. frequency is a linear function of the fiber diameter. Using the 40.242 conversion constant discussed above, the O.D. frequency for a 125 micron fiber is approximately 3.1 cycles/degree. If fibers having diameters of up to 250 microns are to be measured, a low pass filter having a cut-off frequency above 6.2 cycles/degree would thus be chosen.

The effect of filtering is to introduce a shift (bias) in the frequency of the O.D. line. In particular, after filtering the peak appears to have been shifted to the frequency at which the spectrum obtained for unfiltered data has a slope equal and opposite in sign to that of the filter gain slope at the O.D. frequency. Accordingly, a filter should be selected for which the bias is less than the precision with which the O.D. line is to be determined. For the Parks-McClellan filter discussed below, the bias is less than about $25 \times 10^{-6}$ cycles/degree and thus does not substantially affect the precision of the diameter measurement.

To achieve an improved s/n ratio, spectral power above the Nyquist or folding frequency for the downsampled data should be removed. For example, for 2048 pixels distributed over a 20° detector, the Nyquist frequency is 51.2 cycles/degree ($f_N = 0.5*(2048/20) = 51.2$ cycles/degree). Downsampling the data to 256 data points (i.e., an 8 to 1 decimation) reduces the Nyquist frequency to 6.4 cycles/degree. Accordingly, a low pass filter having a cut-off frequency in the neighborhood of 6.4 cycles/degree would be used for this example. It should be noted that this number is greater than the 6.2 cycles/degree value calculated above based on a fiber diameter of 250 microns. The larger number, of course, is the one which needs to be implemented.

Various digital filters known in the art can be used for the low pass filter. Similarly, various downsampling rates can be employed in the practice of the invention. For example, for 2048 data points distributed over a 20° detector, downsampling at an 8:1 rate and filtering with a 26 point finite impulse response (FIR) Parks-McClellan filter have been found to work successfully.

Figure 7:
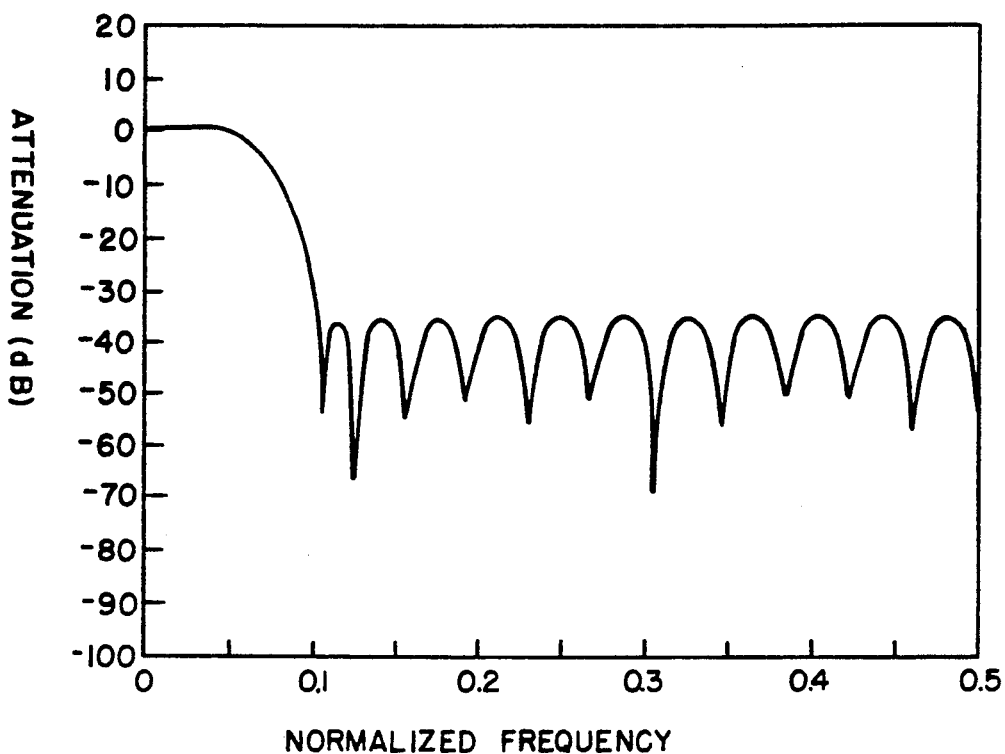
FIG. 7 is a plot of the frequency domain response of a Parks-McClellan filter which can be used in the practice of the invention. The frequencies plotted along the x-axis in this figure have been normalized to the sampling frequency prior to downsampling.

A general discussion of Parks-McClellan filters can be found in A. V. Oppenheim and R. W. Schafer, *Discrete-Time Signal Processing*, Prentice-Hall, Englewood Cliffs, N.J., 1989, pp. 465–488; and T. W. Parks and C. S. Burrus, *Digital Filter Design*, John Wiley & Sons, New York, 1987, pp. 89–106, the relevant portions of which are incorporated herein by reference. Table 1 sets forth a suitable set of coefficients for use with this filter. These coefficients produce a cut-off frequency of approximately 6.4 cycles/degree and in practice have been found to accurately pass the O.D. lines for fibers in the 40 to 250 micron range. A plot of the filter's frequency domain response is shown in FIG. 7. Downsampling of the original data is achieved by calculating an output for this filter for every eighth point.

II. Fast Fourier Transform

The second on-line processing step 54 comprises performing a fast Fourier transform on the filtered and downsampled data to produce a set of complex coefficients in the frequency domain. A suitable procedure for performing the FFT is that described by Cooley, Lewis, and Welch in a paper entitled "The Fast Fourier Transform and its Applications," IBM Research Paper RC 1743, Feb. 9, 1967, the pertinent portions of which are incorporated herein by reference.

As discussed above, in addition to its use in precisely determining fiber diameters, the output of the FFT can also be used to detect defects such as holes in the fiber and to monitor the operation of the laser, optical system, and detector by, for example, checking the overall power in the FFT spectrum and/or the amplitude of the DC and/or O.D. lines.

III. Identification of the O.D. Line In the FFT Spectrum

The third on-line processing step 56 comprises identifying the O.D. line in the FFT spectrum. The search is performed using the magnitudes of the FFT coefficiencies. The goal is to find the coefficient having the largest magnitude, other than the DC coefficient or coefficients relating to defects in the fiber, the frequencies for which are smaller than that of the O.D. line.

If the diameter of the fiber being measured is generally known, the search can begin above the region where the O.D. line for such a fiber is expected to occur and then proceed downward. More particularly, the search can begin with lines above the frequency of the expected O.D. line and then proceed to lines having lower frequencies. (Note that the spacing of the FFT lines is one over the angular extent of the detector, e.g., 0.05 cycles/degree for a 20° detector.) For example, for the 125 micron representative fiber described above, the search would begin above 3.1 cycles/degree, e.g., above spectrum line 62 for a 20° detector.

Alternatively, the search can begin above the region of the O.D. line for the largest fiber diameter the system is designed to measure and proceed downward to lower frequencies, e.g., if the largest fiber to be measured has a diameter of 250 microns, the search can begin above spectrum line 124 and proceed downward.

In either case, the search can be terminated in the region of the O.D. line for the smallest fiber diameter to be measured, e.g., a diameter of about 40 microns corresponding to about spectrum line 20 for a 20° detector.

The desired maximum can be found be searching for a line whose magnitude is greater than both the adjacent preceding and adjacent succeeding lines. Also, it is desirable to require that the magnitude of the maximum line be greater than a threshold.

In particular, it has been found that FFT spectrums for optical waveguide fibers can include a peak at a frequency above the O.D. line (see line 72 in FIG. 4), the presence or absence of which depends upon the wavelength of the incident light and the diameter of the fiber. It is believed that this higher frequency line results from "gallery" modes which propagate around the surface of the fiber, and thus whether or not a particular fiber produces this line will depend upon the length of the fiber's circumference in relation to the wavelength of the incident light. This higher frequency line has a smaller amplitude than the O.D. line. Accordingly, by properly setting the threshold, the search procedure will ignore this line and find the desired O.D. line. In practice, the use of a fixed threshold of nominally one fourth (0.25) of the typical peak amplitude of the O.D. line has been found to work successfully in identifying the O.D. line in the presence of the gallery mode line. If desired, an automatic gain control system applied to the operation of the detector can be used to keep the expected height of the O.D. line constant.

Once the O.D. line has been identified, it and a preselected number of lines on either side of it are used in the remaining on-line process steps. As discussed above, in accordance with the invention, it has been found that the original fringe data does not have to be used in determining the fine grid DSFTs. (Note that the original data can be used if desired.) Rather, reconstructed data obtained by applying inverse DSFTs to selected FFT coefficients in the region of the O.D. line has been found to contain sufficient information to allow the location of the O.D. line to be determined with high precision.

The number of FFT coefficients which needs to be retained for the subsequent on-line processing steps depends upon such variables as the spacing of the FFT lines, the "window" correction applied to the data, the data's signal to noise ratio, the range of diameters to be measured, the size of the detector, and the inherent modulation of the frequency of the fringe pattern predicted by the Watkins model as well as that introduced by the lens system used to project the interference pattern onto the detector. As a general guide, the selected FFT lines should extend out from the O.D. line by at least about $\pm 4/M\Delta\theta$ cycles/degree, where M is the number of data points and $\Delta\theta$ is the spacing between data points. That is, at least four FFT lines on either side of the O.D. line should be used.

For any particular application, the optimal number of lines can be determined by, for example, applying the process to simulated fringe data for a set of selected fiber diameters, and then varying the number of lines used to reconstruct the data to find the number for which the process generates fiber diameters which are sufficiently close to the selected fiber diameters. The simulated fringe data can be calculated using, for example, the Watkins equations or a wave equation model to which is added simulated noise, e.g., white Gaussian noise.

In practice, for the representative parameters set forth above and the preferred process steps of FIGS. 5 and 6, it has been found that a total of 15 FFT coefficients centered around the O.D. line are sufficient to provide the desired 0.02 micron level of precision in the measured fiber diameters. Even fewer lines can be used if desired. For example, as few as 9 lines were found to produce good results, although the 15 line results were considered more robust.

In FIG. 5, the 15 coefficients are represented by the column vector $[A_1...A_{15}]$.

IV. Matrix Multiplication

The fourth on-line processing step 58 comprises multiplying the selected FFT coefficients by a precomputed matrix which incorporates 1) the inverse DSFT operation, 2) frequency demodulation, 3) the window correction, and 4) the calculation of the fine grid DSFT lines. In FIG. 5, this matrix is identified by the reference numeral 60. The construction of this matrix is shown in FIG. 6 and discussed in detail below. The result of multiplying the FFT coefficients by the precomputed matrix is to produce a set of complex coefficients representing the spectral power at the fine grid frequencies.

The number of columns in the matrix equals the number of FFT coefficients, e.g., 15, and the number of rows equals the number of fine grid DSFT lines, e.g., 11. Because both the FFT lines used to reconstruct the data and the fine grid used for the DSFTs must be spaced around the O.D. line, the values of the matrix elements change as the location of the O.D. line changes. In practice, a large matrix, e.g., a matrix having 100 columns and 500 rows, is constructed covering a range of O.D. line locations, and the coarse location of the O.D. line as determined by FFT step 54 is used to select the appropriate columns and rows of this large matrix for use in multiplication step 58.

The range of O.D. line locations which are included in the matrix is determined by the range of diameters the system is to measure, e.g., if the system is to measure diameters ranging from 40 microns to 250 microns, then for the representative parameters set forth above, O.D. lines ranging from about 1.0 cycle/degree to about 6.2 cycles/degree would be included in the large matrix.

The number of columns needed in the large matrix to cover this range depends on the spacing between the FFT lines. As discussed above, the FFT spacing for a 20° detector is 0.05 cycles/degree. Accordingly, approximately 100 columns would be needed to cover the range from 1.0 to 6.2 cycles/degree for this detector. Similarly, the number of rows is determined by the fine grid spacing. For a fine grid spacing of 0.01 cycles/degree, approximately 500 rows would be needed to cover the same range.

The large matrix is stored in a ROM or other suitable storage medium for access as a look-up table during the performance of the on-line processing steps.

V. Location of the O.D. Line in the DSFT Spectrum

The fifth and sixth on-line processing steps 62 and 64 comprise locating the O.D. line in the fine grid DSFT spectrum generated by matrix multiplication step 58.

A two step process is preferably used. First, in step 62, the locations of the three brightest DSFT lines are determined, i.e., the three C(f) coefficients in equation 4 having the largest magnitudes are located. (Note that the $x(k\Delta\theta)$ values used in equation 4 are not the original data points, but rather the points after signal processing in accordance with FIG. 5.) Then, in step 64, a parabola is fitted to these three points to obtain an even better estimate of the frequency corresponding to the maximum spectral power.

In particular, using the magnitudes of the three largest coefficients ($|C(f_{m-1})|$, $|C(f_m)|$, and $|C(f_{m+1})|$), the a, b, and c coefficients in the following equation are determined:

$$|C(f)| = a + bf + cf^2 \tag{5}$$

The frequency corresponding to the peak of the parabola is then given by:

$$f_p = -b/(2c). \tag{6}$$

VI. Determination of Fiber Diameter Value

The last on-line processing step 66 comprises converting the frequency determined from equation 6 to a fiber diameter value. As discussed above, this step simply involves multiplying the frequency by a constant, e.g., 40.242 for the representative parameters discussed above. In practice, the constant is preferably determined empirically by calibrating the system using cylindrical fibers having known diameters.

Turning now to FIG. 6, this figure describes the various components which make up the precalculated matrix used in step 58 of FIG. 5. In particular the precalculated matrix is the product of four matrices identified by the letters A, B, C, and D in FIG. 6.

The construction of each of these matrices is discussed below. For ease of explanation, the discussion is in terms of the matrix elements used for any one calculation in step 58, it being understood that in practice the matrix elements are selected from the large matrix based on the frequency of the O.D. line determined from FFT step 54.

A. Inverse DSFT Matrix

The inverse DSFT matrix (matrix A) serves to create a reconstructed fringe pattern from the selected FFT coefficients (e.g., 15 coefficients) surrounding the O.D. line determined by FFT step 54. The elements of this complex matrix are given by:

$$a_{mn} = e^{j2\pi f_n m} \tag{7}$$

where m goes from 1 to the number of data points used in performing the FFT (e.g., 256) and n goes from 1 to the selected number of FFT lines used in the reconstruction (e.g., 15). The effect of multiplying the A matrix by the FFT lines is to produce a set of data values which contains substantial information regarding the O.D. line and reduced information regarding other features of the original data, such as, defects in the fiber, gallery modes, DC levels, and the like.

The $f_n$'s in equation 7 are the frequencies in cycles/degree of the selected FFT lines which surround the FFT O.D. line. For example, for a 125 micron fiber, a 20° detector, 15 lines, and the representative parameters described above, the $f_n$'s would be 0.05 cycles/degree apart, would span a range of 0.7 cycles/degree ($14 \times 0.05$), and would be centered around 3.1 cycles/degree.

B. Frequency Demodulation

The frequency demodulation matrix (matrix B) serves to remove variations (modulations) of the fringe pattern frequency over the angular range of the detector due to 1) the inherent frequency modulation of the interference pattern predicted by the Watkins model, and 2) distortions in the fringe pattern introduced by the optical system used to project the pattern onto the detector.

The advantages of removing the frequency modulators are 1) the width of the O.D. peak is somewhat reduced, and 2) the technique becomes less sensitive to missing fringes. Indeed, in practice, it has been found that the measured diameter is essentially unaffected even with as much as 30% of the fringes blocked. Also, if the modulation frequency predicted by the Watkins model were not removed, the estimate of fiber diameter using the location of the O.D. line would exhibit a substantial bias which increased linearly with fiber diameter.

With regard to the inherent frequency modulation of the interference pattern, the Watkins model predicts that the pattern will have a local frequency which varies with $\theta$ as follows:

$$f_L(\theta) = [d\pi/(2\lambda 180)][\cos(\underline{\theta}/2 + n\sin(\underline{\theta}/2) \times [n^2 + 1 - 2n\cos(\underline{\theta}/2)]^{-\frac{1}{2}}] \quad (8)$$

where $\underline{\theta}$ is measured in radians.

Figure 8:
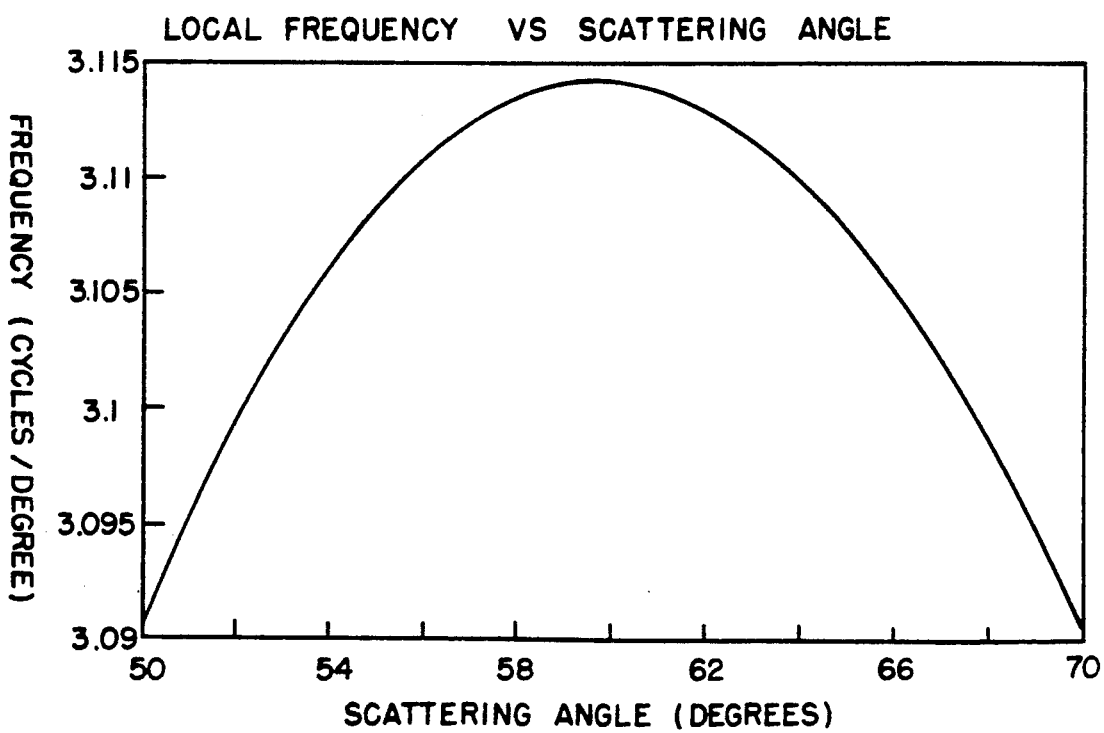
FIG. 8 is a plot of local spatial frequency in cycles/degree versus scattering angle.

This modulation as a function of $\theta$ can be seen in FIG. 8, which shows a plot of equation 8 for the representative parameters discussed above and a 125 micron fiber over the angular range from 50 to 70 degrees. As shown in this figure, the maximum local frequency for these parameters occurs around 60°.

In accordance with the invention, the effect of this frequency modulation is eliminated from the data by substituting at each data point the value of the light intensity which would exist at that point if there were no modulation. The process is illustrated in FIGS. 9 and 10.

Figure 9:
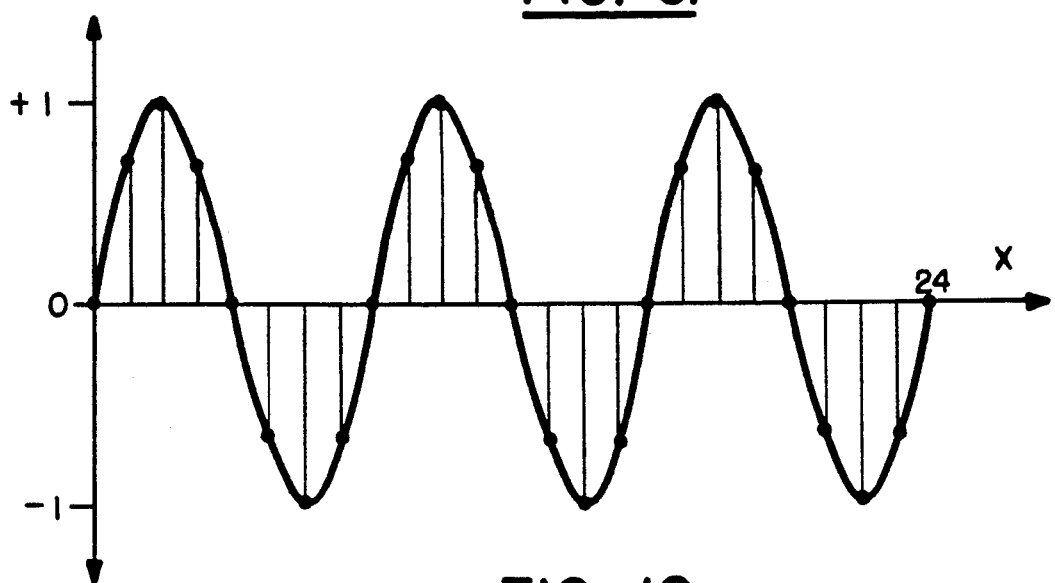
FIG. 9 is a plot of three cycles of a non-frequency modulated sinusoidal curve.

FIG. 9 shows three cycles of a sinusoidal curve which is not frequency modulated. For this curve, the phase of the sine wave increases by 45° for each of the 24 data points shown along the x-axis.

Figure 10:
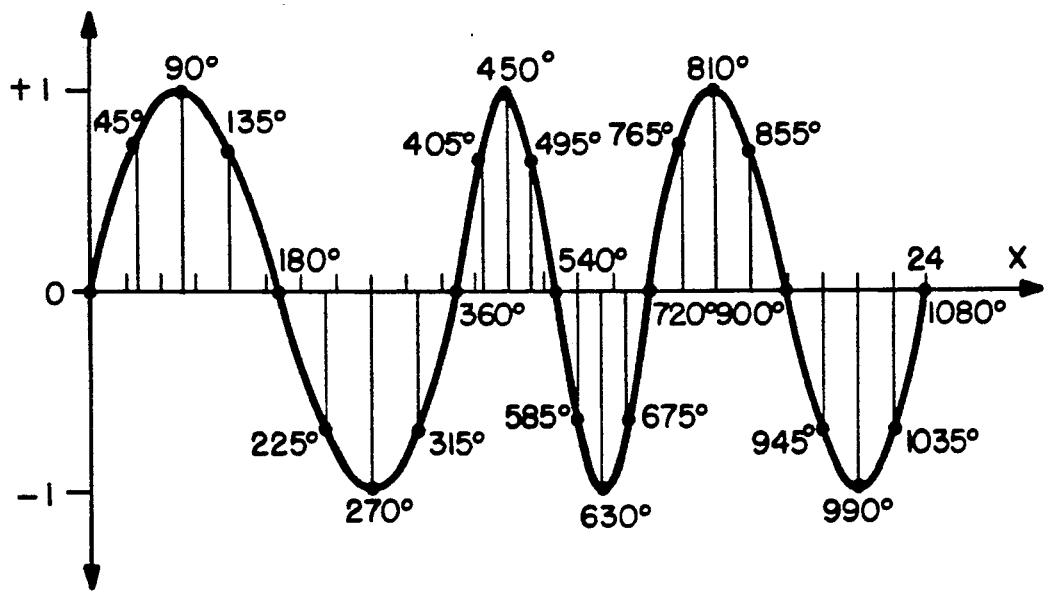
FIG. 10 is a plot of three cycles of a frequency modulated sinusoidal curve.

FIG. 10 shows three cycles of a sinusoidal curve which is frequency modulated over the same 24 data points. The 45° phase points identified in FIG. 10 for this curve are not equally distributed along the x-axis as in FIG. 9, but are variably spaced as a result of the frequency modulation. However, if one were to substitute at each of the 24 data points in FIG. 10, the value of the curve at the corresponding 45° point (e.g., substitute at data point 3, the value of the curve at 3×45°), the result would be FIG. 9.

That is, the result of the substitution would be to eliminate the frequency modulation, while still retaining the same total number of cycles. Looked at another way, the average frequencies for the curves of FIGS. 9 and 10 are the same, but the curve of FIG. 9 is a pure sine wave which can be more readily Fourier analyzed than the curve of FIG. 10. Of course, it is the average frequency which needs to be determined, not the local frequency, and thus analysis of the curve of FIG. 9 provides the required information for a diameter determination even though that curve lacks information about the local frequency.

The problem then becomes identifying the locations of the equal phase points in the interference pattern so that values for those points (i.e., interpolated values for those points (see below)) can be substituted for the values at the original data points. Equation 8 would suggest that such equal phase points cannot be found without first knowing the diameter d of the fiber, which is, of course, the unknown which the process is seeking to determine. However, in accordance with the invention, it has been surprisingly found that the locations of the equal phase points are independent of the fiber's diameter.

In particular, it has been found that the equal phase points $\theta(i)$, $i = 1, 2, ..., M$, where M is the original number of data points, e.g., 256, can be found by solving the following transcendental equations:

$$E(\theta(i)/2) = \alpha E(\theta_b/2) + (1-\alpha)E(\theta_a/2) \quad (9)$$

$$\alpha = (i-1)/(M-1) \quad 2 < i < M-1 \quad (10)$$

where $\theta_a$ and $\theta_b$ are the angular locations of the first and Mth data points, respectively, and $E(\theta_i/2)$ is given by:

$$E(\theta_i/2) = \sin(\theta_i/4) + [n^2 + 1 - 2n\cos(\theta_i/4)]^{\frac{1}{2}} \quad (11)$$

These equations can be solved by well known numerical successive approximation techniques, e.g., by 1) evaluating the right side of equation 9, 2) guessing a value for $\theta_i$, e.g., the angular location of the original data point, 3) determining $E(\theta_i/2)$ for that guess from equation 11, 4) computing the difference $\Delta$ between $E(\theta_i/2)$ and the right side of equation 9, and 5) repeating the process with an improved guess until $\Delta$ is sufficiently small. The improved guess can, for example, be the original guess minus $\Delta \times (\theta_b - \theta_a)/(E(\theta_b/2) - E(\theta_a/2))$.

Figure 11:
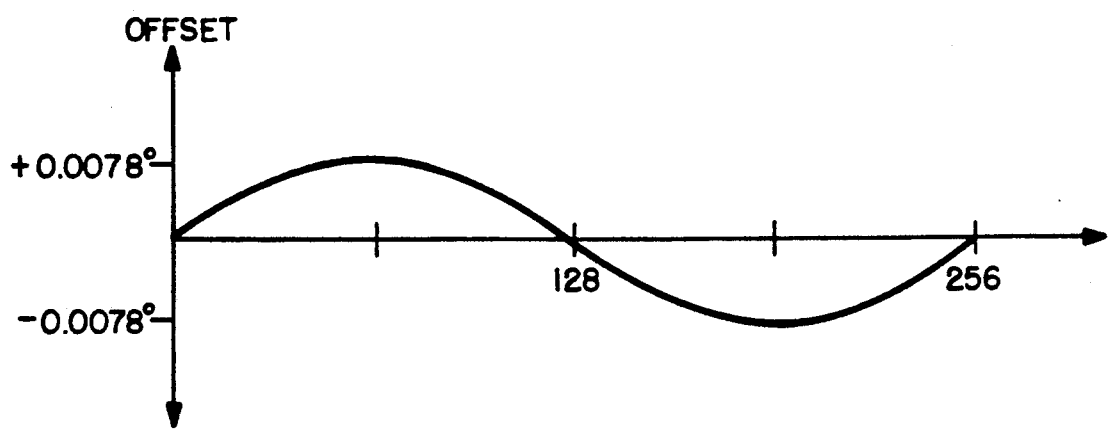
FIG. 11 is a plot of angular offset versus data point location used in the removal of frequency modulation from the far-field interference data.

The results of applying this process is shown in FIG. 11 in terms of the offset between the actual locations of the data points and the points at which the value of the interference pattern needs to be determined to eliminate the frequency modulation. That is, for the first 128 data points, the value of the interference pattern needs to be determined at a slightly larger angle (e.g., a maximum increase of 0.0078° for data point 64), and for the second 128 data points, at a slightly smaller angle (e.g., a maximum decrease of 0.0078° for data point 192).

The plot of FIG. 11 provides a convenient way of incorporating into the frequency demodulation matrix the effects of distortions resulting from the optical system used to project the far-field interference pattern onto the detector.

Using conventional ray-tracing techniques, a plot similar to FIG. 11 can be constructed for the particular lens system used in the fiber measurement system. That is, for each data point, an offset can be calculated representing the actual location of the light which theoretically should hit that point, e.g., if a particular data point theoretically represents light at 55°, but light at 55° actually strikes the photodetector array at 54.95°, the offset would be 0.05°. Then, by simply adding the lens offsets to the FIG. 11 offsets, a combined set of offsets is obtained which represents the locations where values of the interference pattern are needed to remove both the inherent frequency modulation and the effects of lens distortion from the interference pattern.

Once the combined offsets have been obtained, the next step is to determine the values of the interference pattern at the offset points. In general terms, this is an interpolation problem where the goal is to determine a set of values $y_i'$ at a set of points $\theta_i'$ (the offset points) from a known set of values $y_i$ (i.e., the reconstructed data obtained from the operation of the "A" matrix in FIG. 6) at a set of points $\theta_i$ (the locations of the original data points), where $i=1,2,...,M$ and M is the number of data points (e.g., 256).

Various interpolation techniques known in the art can be used to determine the values at the offset points, e.g., linear interpolation, sin(x)/x interpolation, and the like. In accordance with the invention, it has been found that the minimum norm interpolation technique is particularly well-suited to determining the amplitudes of the interference pattern at the offset points in that it produces significantly less bias in the diameter determination over the entire range of expected diameters (e.g., from 50 microns to 250 microns) than, for example, linear interpolation or sin(x)/x interpolation. General discussions of the minimum norm interpolation technique can be found in the following references, the pertinent portions of which are incorporated herein by reference: M. Golomb and H. F. Weinberger, "Optimal Approximation and Error Bounds", *On Numerical Approximation*, R. E. Langer ed., The University of Wisconsin Press, Madison, pp. 117-190, 1959; C. A. Michelli and T. J. Rivlin, "A Survey of Optimal Recovery", *Optimal Estimation in Approximation Theory*, C. A. Michelli, T. J. Rivlin, eds., Plenum Press, 1977, pp. 1-53; T. W. Parks and R. G. Shenoy, "An Optimal Recovery Approach to Interpolation", *Proc. Princeton Conf. on Information Sciences and Systems*, Princeton University, Princeton, N.J., March 1988; G. Oetken, T. W. Parks, and H. W. Schussler, "New Results in the Design of Digital Interpolators", *IEEE Trans. ASSP*, Vol. ASSP-23, No. 3, pp. 301-309, June 1975; T. W. Parks and D. P. Kolba, "Interpolation Minimizing Maximum Normalized Error for Bandlimited Signals", *IEEE Trans. ASSP*, Vol. ASSP-26, No. 4, pp. 381-384, August 1978.

To implement the minimum norm technique, a matrix inversion must be performed to find the elements of the "B" matrix in FIG. 6. In particular, the rows of the B matrix comprise the vectors $\hat{b}$ obtained by solving the following matrix equation:

$$\hat{b} = g^{-1}\hat{c} \quad (12)$$

where g is a $M \times M$ matrix, the elements of which are given by:

$$g_{ij} = \text{sinc}(2w/k \, (\theta_i - \theta_j)) \quad (13)$$

$\hat{e}$ is a vector having M elements given by:

$$e_i = \text{sinc}(2w/k \, (\theta_i' - k\theta_i)) \quad (14)$$

and $\theta_i'$ are the locations of the original data points, $\theta_1'$ are the locations of the offset data points, the constant k is selected based on the desired fineness of the interpolation, the constant w is selected based on the bandwidth of data being interpolated, and M is the number of data points (e.g., 256).

In practice, $w=0.5$ and $k=1,000$ have been found to work successfully in the demodulation of the reconstructed data generated by the A matrix of FIG. 6. Matrix g turns out to be ill-conditioned and thus is difficult to invert using standard techniques. However, the matrix is also Hermitian Toeplitz, i.e., the elements along any diagonal are identical and the matrix is symmetrical about the main diagonal. Techniques for inverting matrices of this type, even when ill-conditioned, are available. In particular, S. L. Marple in his text entitled *Digital Spectral Analysis with Applications*, Prentice-Hall, Englewood Cliffs, N.J., 1987, page 107, describes a technique which has been found to work successfully. The relevant portions of this reference are incorporated herein by reference.

C. Window Correction

Figure 12:
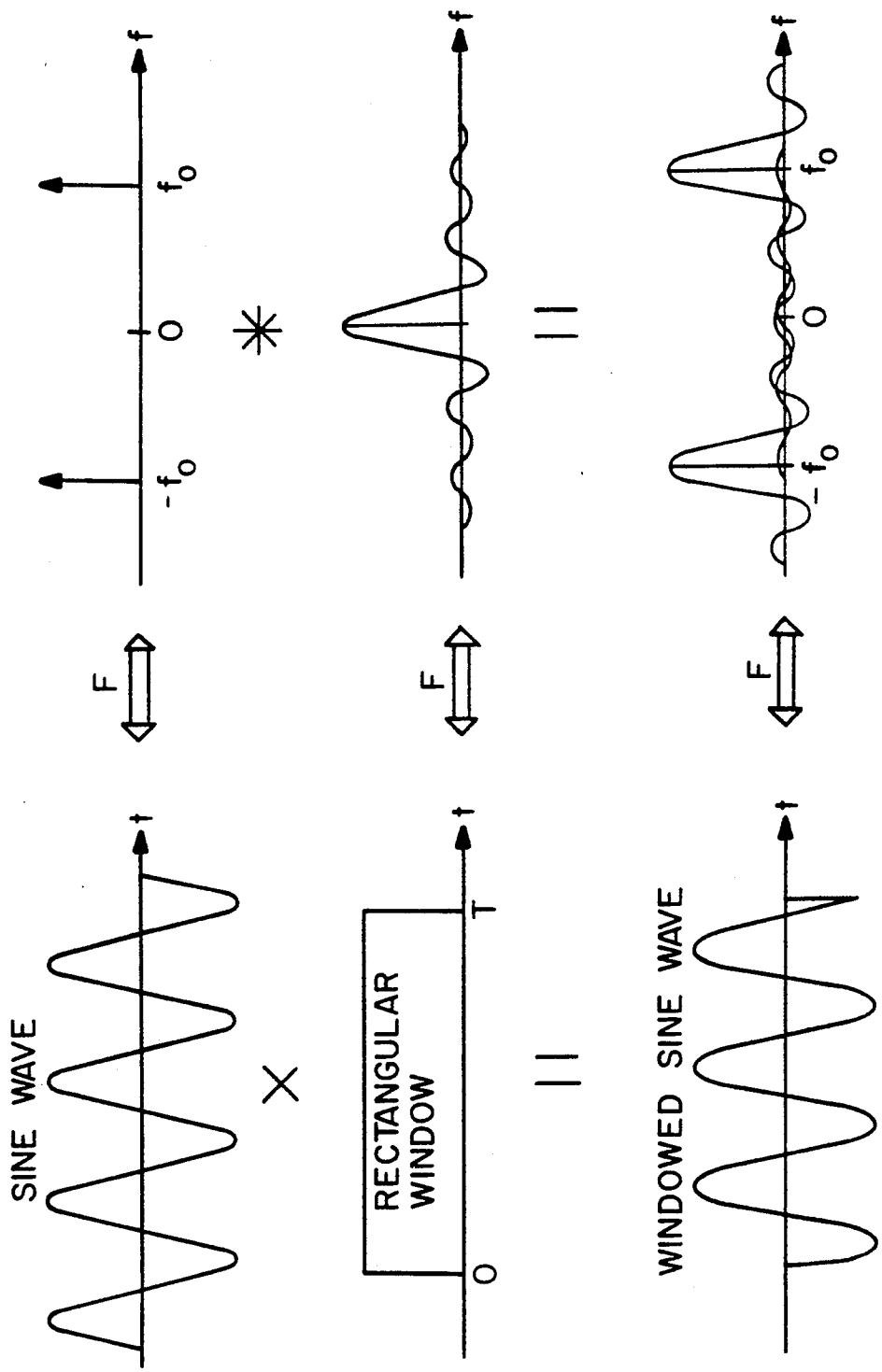
FIGS. 12 and 13 are schematic diagrams illustrating the effects of a rectangular versus a tapered window on the Fourier transform of a truncated sine wave.

The need for a window correction is illustrated in FIG. 12. The first panel of this figure shows the Fourier transform of an infinite sine wave of frequency $f_0$, the second panel shows the Fourier transform of a rectangular window, and the third panel shows the Fourier transform of the sine wave of the first panel after truncation (windowing) by the rectangular window.

As can be seen from this figure, the windowing causes broadening of the spectral lines at $\pm f_0$. Such broadening increases the RMS error in determining the location (frequency) of these lines. The amount of broadening is inversely related to the size of the window, i.e., larger windows produce less broadening.

Because the tails of the main lobes of the transform of the windowed sine wave extend under each other, i.e., mix with one another, windowing also causes shifts or biases in the location of the lobes along the frequency axis.

Figure 13:
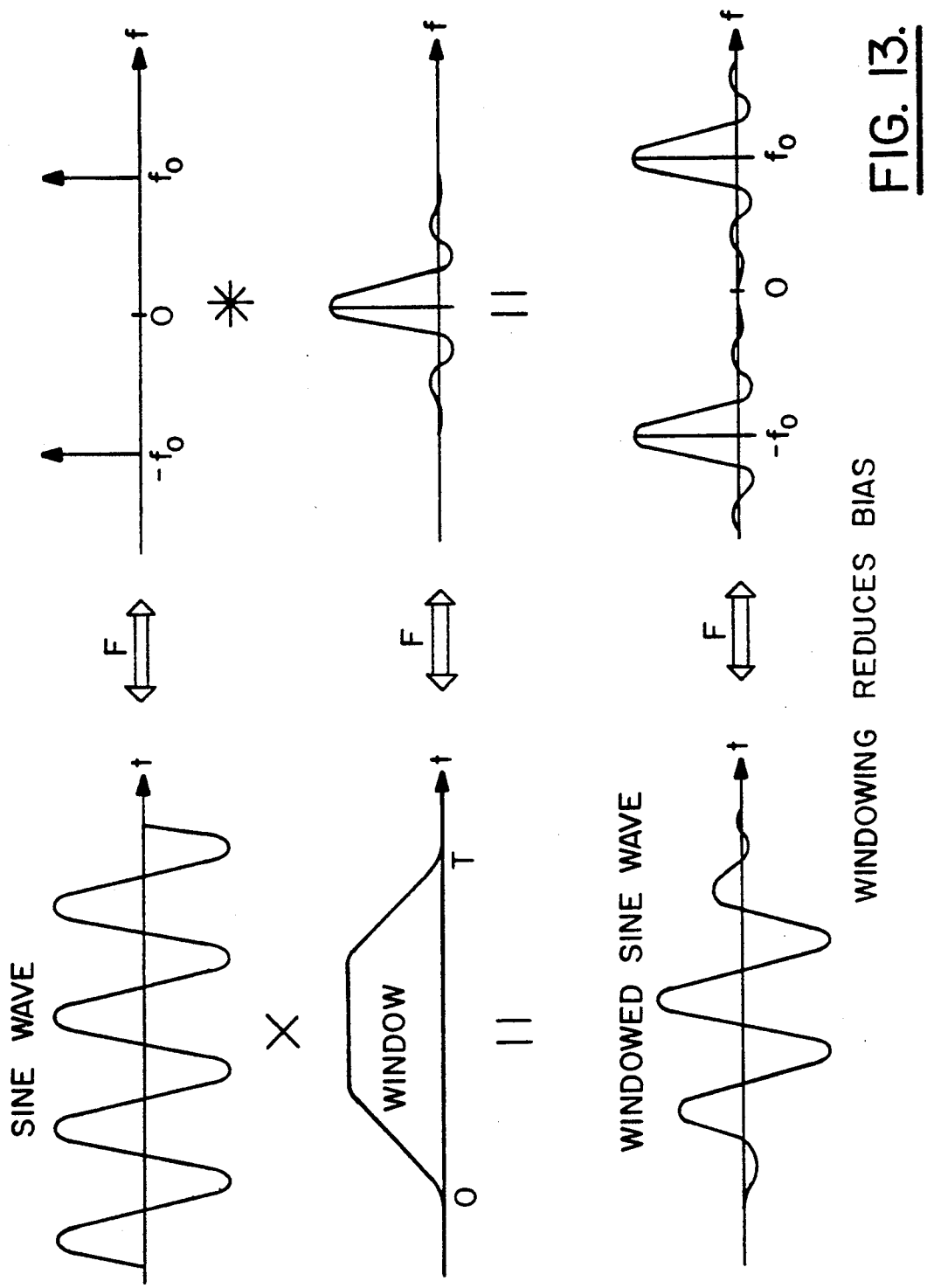

FIG. 13 illustrates a procedure for controlling the effects of the window on the frequency spectrum. Specifically, as shown in this figure, a tapered window is used rather than one having square edges. The effect of the taper is to truncate the tails which extend away from the main lobes of the transform of the windowed sine wave, thus minimizing the bias effect on the location of those lobes. The taper, however, also reduces the effective width of the window which increases the broadening of the lobes, thus increasing the RMS error in determining the location of the lobes.

Thus, there is a trade-off between controlling bias and controlling RMS error. In practice, it has been found that for fiber diameter measurements performed using the preferred procedures of FIGS. 5 and 6, and for a detector having around a 20° angular extent, a smooth taper of the first and last 32 data points of the 256 downsampled data points using a cosine function provides a good compromise between the bias and RMS error considerations.

Specifically, a C matrix having the following elements has been found to work successfully in minimizing the effects of the finite window over which the interference data is measured:

$$C_{ii} = 0.5 \, (1 - \cos(\pi i/32)) \; i=1,...,32;$$
$$M-32,...,M \quad (15)$$

$$C_{ii} = 1.0 \; i=33,...,M-33 \quad (16)$$

$$C_{ij} = 0.0 \; i \neq j \quad (17)$$

Cosine windows using more or less data points, as well as other windowing procedures known in the art, can be used if desired. As with other aspects of the invention, the specific parameters for use with such alternate windowing procedures can be determined using simulated interference data for fibers having a range of selected diameters.

D. Fine Grid DSFTs

The elements of the D matrix of FIG. 6 comprise the exponentials of equation 4 evaluated for the selected fine line spatial frequencies surrounding the coarse value of the O.D. line determined by FFT step 54.

The spacing between the fine line spatial frequencies must be small enough for parabolic fitting step 64 to provide a precise estimate of the actual location of the O.D. line. Also, since the actual O.D. line can be anywhere in the range defined by the FFT lines on either side of the coarse O.D. line, a sufficient number of fine line spatial frequencies must be chosen to cover that range.

The shape of the O.D. peak depends upon a variety of factors including the window, the inherent frequency modulation predicted by the Watkins model, and the distortion introduced by the lens. Accordingly, in general, the peak does not have the shape of a parabola. However, a parabola is a good approximation for the shape of the peak in the immediate vicinity of the peak's maximum value.

Thus, parabola fitting step 64 works well provided the spacing between the fine line spatial frequencies is sufficiently small, i.e., provided the lines used for the parabolic fitting closely surround the location of the peak's maximum value. As the spacing between the lines increases, the parabolic assumption becomes progressively less true. In practice, the breakdown in the parabolic assumption manifests itself as an error in the diameter estimation which is periodic with fiber diameter and increases in amplitude as the fine grid spacing is increased.

In practice, for an FFT line spacing of 0.05 cycles/degree, a fine line spacing of 0.01 cycles/degree and a total of 11 fine lines centered on the coarse O.D. line have been found to work successfully. Of course, other spacings and numbers of lines can be used if desired.

Following the foregoing procedures, the large matrix is constructed by multiplying together appropriate sets of the small matrices for a range of coarse O.D. lines sufficient to cover the range of fibers diameters which are to be measured. As discussed above, the large matrix is stored in a suitable storage medium and accessed during on-line processing to provide the appropriate small matrix for the O.D. line determined by FFT step 54.

Figure 14:
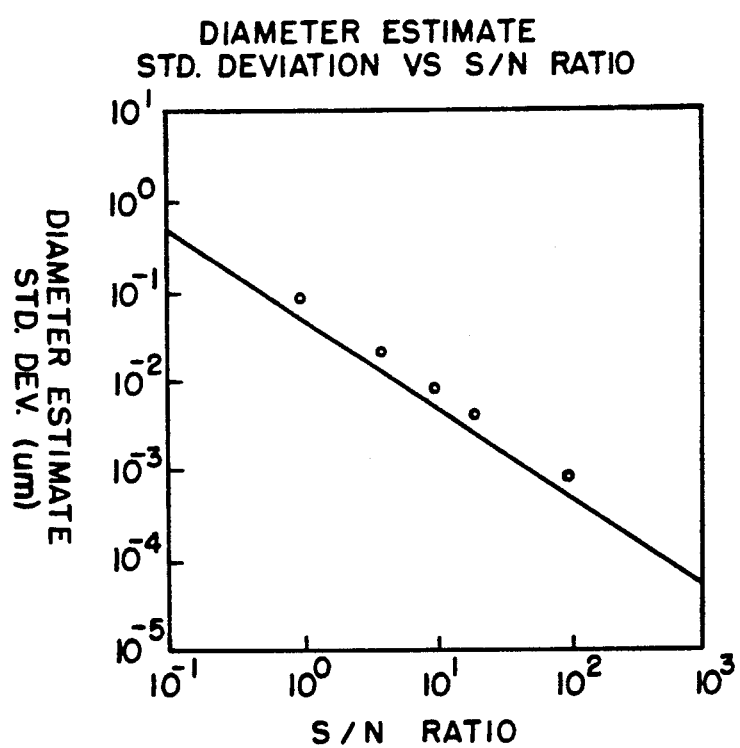
FIG. 14 is a plot of fiber diameter standard deviation versus signal to noise ratio. The data points represent the results of applying the procedures of the invention to simulated interference patterns for fibers of various diameters. The straight line represents the theoretical lower limit (Cramer-Rao bound) for the standard deviation as a function of signal to noise ratio.

In practice, the procedures of the invention have been found to provide fiber diameter measurements of very high precision. FIG. 14 illustrates the results of testing performed on the procedure using simulated interference patterns to which various amounts of Gaussian noise were added to vary the signal to noise ratio. The interference patterns were calculated using the representative parameters discussed above for fibers having diameters of 123, 125, and 127 microns.

The data points in FIG. 14 show the standard deviations obtained by performing repeated measurements on the simulated data with different random noise being added to the data for each measurement. The straight line represents the theoretical lower limit (Cramer-Rao bound) for the standard deviation.

As demonstrated by this figure, the invention essentially achieves the Cramer-Rao bound which means that no other unbiased method for analyzing far-field interference patterns which may be developed will be more precise than the present method.

In addition to testing on simulated data, the invention has also been tested on both stationary and moving optical waveguide fibers. Again, extremely high precision was observed. Indeed, for a stationary fiber, repeated measurements did not change over time in the third decimal place, i.e., the standard deviation of the measurement was less than 0.001 microns.

It is important to note that the invention achieves this very high level of precision even though only a limited angular range of measurement is used, e.g., a detector having an angular extent of around 20°. This result leads to a number of benefits. First, it facilitates the implementation of the ellipticity-insensitive technique discussed above since it allows two detectors to be spaced apart by 120° without overlap of their ranges. Similarly, it allows the detector to view a range of the interference pattern above 50° where the effect of the fiber's core is small. Further, it allows for the use of simpler optics since only a small angular range needs to be projected onto the detector, rather than a large range, e.g., 80°, as in the prior art.

The process of the invention as described above is preferably practiced on a digital computer system configured by suitable programming to perform the various computational steps. The programming can be done in various programming languages known in the art. A preferred programming language is the C language which is particularly well-suited to performing scientific calculations. Other languages which can be used include FORTRAN, BASIC, PASCAL, C++, and the like.

The computer system can comprise a general purpose scientific computer and its associated peripherals, such as the computers and peripherals currently being manufactured by Digital Equipment Corporation, IBM, Hewlett-Packard, or the like. Alternatively, a dedicated system can be used in the practice of the invention. In particular, a dedicated system using multiple digital signal processing chips is preferred to perform on-line processing steps 52 through 64 of FIG. 5.

Preferably, the processing portion of the computer system should have the following characteristics: a processing rate of 50 million floating point operations per second; a word length of 32 bits floating point, at least four megabytes of memory, and at least 40 megabytes of disk storage to hold the large matrix. The system should include means for inputting data from the photodetector array and means for outputting the measured diameter both in electronic form for use in process control and in visual form for observation by system operators, maintenance personnel, and the like. The output can also be stored on a disk drive, tape drive, or the like for further analysis and/or subsequent display.

Although specific embodiments of the invention have been described and illustrated, it is to be understood that modifications can be made without departing from the invention's spirit and scope. For example, although the optimum benefits of the invention may not be achieved, the invention can be practiced by using subsets of the on-line and off-line processing steps set forth in FIGS. 5 and 6. Similarly, the specific order of steps set forth in those figures can be varied, e.g., the cosine window could be applied prior to frequency demodulation.

More generally, techniques besides the preferred technique of determining DSFTs on a fine grid having a small number of lines, can be used to obtain a precise estimate of the average spatial frequency of the far-field interference pattern. For example, a padded FFT can be used in which a large number of zeros are added on either side of the actual data points to simulate a larger detector and thus reduce the spacing between the FFT lines. Also, zoom FFTs and band-selectable Fourier transforms, as discussed in, for example, *The Digital Design Handbook* by Fred J. Taylor, Marcel Dekker, Inc., New York, 1983, pages 58-64, can be used.

Whatever technique is used, it must generate Fourier transform coefficients for a set of lines which are spaced close enough together so that the location of the O.D. peak can be estimated with a precision of at least $5 \times 10^{-4}$ cycles/degree so that the diameter of the fiber can be determined with a precision of at least 0.02 microns. The fine grid DSFT approach described in detail herein achieves this result in a computationally efficient manner. Alternate techniques of the type described above can also achieve this level of precision but at the cost of greater computational effort.

TABLE 1
Coefficients for 26 Tap Parks-McClellan FIR Filter

| | | | |
|---|---|---|---|
| H(1) | = H(26) | = | −.13507720E−01 |
| H(2) | = H(25) | = | −.13547450E−01 |
| H(3) | = H(24) | = | −.16699000E−01 |
| H(4) | = H(23) | = | −.16727490E−01 |
| H(5) | = H(22) | = | −.11988860E−01 |
| H(6) | = H(21) | = | −.13101290E−02 |
| H(7) | = H(20) | = | .15623170E−01 |
| H(8) | = H(19) | = | .38029570E−01 |
| H(9) | = H(18) | = | .63995060E−01 |
| H(10) | = H(17) | = | .90693700E−01 |
| H(11) | = H(16) | = | .11479270E+00 |
| H(12) | = H(15) | = | .13305890E+00 |
| H(13) | = H(14) | = | .14290310E+00 |

What is claimed is:

1. A method for measuring the diameter of a transparent filament comprising the steps of:
   (a) directing a beam of radiation at said filament so as to produce an interference pattern;
   (b) detecting said interference pattern, said detected interference pattern comprising amplitude values at a set of data points; and
   (c) determining a value for the average spatial frequency of the detected interference pattern by:
      (i) transforming the amplitude values to the spatial frequency domain by performing discrete sequence Fourier transforms at a set of selected spatial frequencies to produce a Fourier coefficient for each of the selected spatial frequencies; and
      (ii) determining a value for said spatial frequency from said Fourier coefficients, said value for the average spatial frequency being a measure of the filament's diameter 2. The method of claim 1 wherein the amplitude values are filtered prior to step (c).

3. The method of claim 2 wherein the filtering is performed using a Parks-McClellan finite impulse response low pass filter.

4. The method of claim 1 wherein the number of data points is reduced prior to step (c).

5. The method of claim 1 wherein, prior to step (c), a fast Fourier transform is performed on said detected interference pattern to produce a set of fast Fourier transform coefficients, a selected subset of said fast Fourier transform coefficients are used to produce reconstructed amplitude values, and the reconstructed amplitude values are used in step (c) to determine a value for the average spatial frequency.

6. The method of claim 5 wherein about 15 fast Fourier transform coefficients are used to produce the reconstructed amplitude values.

7. The method of claim 1 wherein, prior to step (c), frequency demodulation is performed on the amplitude values to produce demodulated amplitude values and the demodulated amplitude values are used in step (c) to determine a value for the average spatial frequency.

8. The method of claim 7 wherein the frequency demodulation employs predetermined offsets of the locations of the data points.

9. The method of claim 8 wherein the predetermined offsets are determined from the inherent frequency modulation of the interference pattern.

10. The method of claim 8 wherein the interference pattern is detected using a lens system and wherein the predetermined offsets include the distortion of the lens system.

11. The method of claim 8 wherein the demodulated amplitude values are determined at the offset locations of the data points by interpolation.

12. The method of claim 11 wherein the interpolation is a minimum norm interpolation.

13. The method of claim 1 wherein windowing is performed on the amplitude values prior to step (c).

14. The method of claim 13 wherein a cosine window is employed.

15. The method of claim 1 wherein the value for the average spatial frequency is determined in step (c)(ii) by selecting the Fourier coefficient having the largest magnitude.

16. The method of claim 1 wherein the value of the average spatial frequency is determined in step (c)(ii) by fitting a parabola to the magnitudes of a subset of the Fourier coefficients produced in step (c)(i).

17. The method of claim 1 wherein the selected spatial frequencies are equally spaced and the spacing between the selected spatial frequencies is about 0.01 cycles/degree.

18. The method of claim 1 wherein about 11 selected spatial frequencies are used.

19. The method of claim 1 wherein a fast Fourier transform is used to select the set of selected spatial frequencies.

20. The method of claim 1 wherein step (c)(i) is performed by multiplying the amplitude values by a precomputed matrix.

21. The method of claim 20 wherein the precomputed matrix performs frequency demodulation on the amplitude values.

22. The method of claim 20 wherein the precomputed matrix performs windowing on the amplitude values.

23. The method of claim 1 wherein, prior to step (c), a fast Fourier transform is performed on the detected interference pattern to produce a set of fast Fourier transform coefficients, and wherein step (c)(i) is performed by multiplying a subset of said fast Fourier transform coefficients by a precomputed matrix.

24. The method of claim 23 wherein the precomputed matrix performs frequency demodulation on the amplitude values.

25. The method of claim 23 wherein the precomputed matrix performs windowing on the amplitude values.

26. The method of claim 1 wherein:
   (A) prior to step (c), a set of modified amplitude values are determined by filtering and downsampling the detected interference pattern;

(B) prior to step (c), a fast Fourier transform is performed on the modified amplitude values to produce a set of fast Fourier transform coefficients;

(C) step (c)(i) is performed by multiplying a subset of said fast Fourier transform coefficients by a precomputed matrix which performs frequency demodulation and windowing; and (D) the value for the average spatial frequency is determined in step (c)(ii) by fitting a parabola to the magnitudes of a subset of the Fourier coefficients produced in step (c)(i).

27. The method of claim 26 wherein the precomputed matrix is selected from a larger matrix and the fast Fourier transform of step (B) is used to make the selection.

28. The method of claim 26 wherein the size of the precomputed matrix is approximately 29. A method for measuring the diameter of a transparent filament comprising the steps of:
(a) directing a beam of radiation at said filament so as to produce an interference pattern;
(b) detecting said interference pattern, said detected interference pattern comprising a set of amplitude values; and
(c) determining a value for the average spatial frequency of the detected interference pattern by performing discrete sequence Fourier transforms, a padded fast Fourier transform, a zoom fast Fourier transform, or a band-selectable Fourier transform on said set of amplitude values, said value for the average spatial frequency being determined with a precision of at least about $5 \times 10^{-4}$ cycles/degree and being a measure of the fiber's diameter.

30. The method of claim 29 wherein the value for the average spatial frequency is determined with a precision of at least about $25 \times 10^{-6}$ cycles/degree.

31. The method of claim 29 wherein the value for the average spatial frequency is determined at a rate of at least about 500 measurements/second.

32. A method for measuring the diameter of a transparent filament comprising the steps of:
(a) directing a beam of radiation at said filament so as to produce an interference pattern;
(b) detecting said interference pattern, said detected interference pattern comprising a set of amplitude values;
(c) determining a value for the average spatial frequency of the detected interference pattern by performing discrete sequence Fourier transforms, a padded fast Fourier transform, a zoom fast Fourier transform, or a band-selectable Fourier transform on said set of amplitude values, said value for the average spatial frequency being determined with sufficient precision so that a filament diameter value derived from said value for the average spatial frequency has a precision of at least about 0.02 microns.

33. The method of claim 32 wherein the filament diameter value derived from said value for the average spatial frequency has a precision of at least about 0.001 microns.

34. The method of claim 32 wherein the value for the average spatial frequency is determined at a rate of at least about 500 measurements/second.

35. A method for measuring the diameter of a transparent filament comprising the steps of:
(a) directing a beam of radiation at said filament so as to produce an interference pattern;
(b) detecting said interference pattern; and
(c) determining an average spatial frequency for the detected interference pattern by:
(i) performing a fast Fourier transform on said detected interference pattern to produce a set of fast Fourier transform coefficients;
(ii) reconstructing the interference pattern using a selected subset of said set of fast Fourier transform coefficients; and
(iii) determining an average spatial frequency for said reconstructed interference pattern, said average spatial frequency being a measure of the filament's diameter.

36. The method of claim 35 wherein about 15 fast Fourier transform coefficients are used to reconstruct the interference pattern.

37. A method for measuring the diameter of a transparent filament comprising the steps of:
(a) directing a beam of radiation at said filament so as to produce an interference pattern;
(b) detecting said interference pattern, said detected interference pattern being frequency modulated; and
(c) determining an average spatial frequency for the detected interference pattern by:
(i) removing at least some of the frequency modulation from said detected interference pattern to produce an at least partially demodulated pattern; and
(ii) determining an average spatial frequency for said at least partially demodulated pattern, said average spatial frequency being a measure of the filament's diameter.

38. The method of claim 37 wherein said detected interference pattern comprises amplitude values at a set of data points and wherein step (c)(i) comprises determining demodulated amplitude values at predetermined offsets of the locations of the data points.

39. The method of claim 38 wherein the predetermined offsets are determined from the inherent frequency modulation of the interference pattern.

40. The method of claim 38 wherein the interference pattern is detected using a lens system and wherein the predetermined offsets include the distortion of the lens system.

41. The method of claim 38 wherein the demodulated amplitude values are determined at the offset locations of the data points by interpolation.

42. The method of claim 41 wherein the interpolation is a minimum norm interpolation.

43. A method for measuring the diameter of a transparent filament comprising the steps of:
(a) directing a beam of radiation at said filament so as to produce an interference pattern;
(b) detecting said interference pattern, said detected interference pattern comprising amplitude values at a set of data points; and
(c) determining an average spatial frequency for the detected interference pattern by:
(i) reducing the amplitudes for at least some data points at both ends of the set of data points to produce a modified interference pattern; and
(ii) determining an average spatial frequency for said modified interference pattern, said average spatial frequency being a measure of the filament's diameter.

44. The method of claim 43 wherein the reduction of step (c)(i) is performed in accordance with a cosine function.

45. A method for measuring the diameter of a transparent filament comprising the steps of:
 (a) directing a beam of radiation at said filament so as to produce an interference pattern;
 (b) detecting said interference pattern, said detected interference pattern comprising amplitude values at a set of data points;
 (c) transforming the amplitude values to the spatial frequency domain so as to produce a frequency spectrum comprising a set of Fourier coefficients; and
 (d) using the magnitudes of a subset of said Fourier coefficients to estimate the frequency at which a local maximum of said frequency spectrum occurs, said local maximum corresponding to the outer diameter of the filament so that the estimate is a measure of the filament's diameter.

46. The method of claim 45 wherein a parabola is used to estimate the frequency of the local maximum.

* * * * *

UNITED STATES PATENT AND TRADEMARK OFFICE
CERTIFICATE OF CORRECTION

PATENT NO. : 5,309,221
DATED : May 3, 1994
INVENTOR(S) : Fischer et al.

It is certified that error appears in the above-indentified patent and that said Letters Patent is hereby corrected as shown below:

Col. 8, at line 22 thereof, after "with" insert therefor -- a --.

Col. 8, line 30 thereof, delete "DSF" and insert therefor -- DSFT --.

Col. 10, line 35 thereof, delete "patter" and insert therefor -- pattern --.

Col. 10, line 43 thereof, delete "a" and insert therefor -- at --.

Col. 11, line 12 thereof, delete "ar" and insert therefor -- are --.

Col. 12, line 9 thereof, delete "ar" and insert therefor -- are --.

UNITED STATES PATENT AND TRADEMARK OFFICE
CERTIFICATE OF CORRECTION

PATENT NO. : 5,309,221

DATED : May 3, 1994

INVENTOR(S) : Fischer et al.

It is certified that error appears in the above-indentified patent and that said Letters Patent is hereby corrected as shown below:

Col. 25, line 16, after "approximately" insert --11 by 15.--.

Signed and Sealed this

Eighth Day of November, 1994

Attest:

BRUCE LEHMAN

Attesting Officer      Commissioner of Patents and Trademarks